(12) United States Patent
Goto et al.

(10) Patent No.: US 7,753,200 B2
(45) Date of Patent: Jul. 13, 2010

(54) DISK CONTAINING BODY AND INFORMATION PROVIDING BODY

(75) Inventors: Teiyu Goto, Saitama (JP); Takamasa Araki, Tokyo (JP); Nobutoshi Hamada, Tokyo (JP); Hajime Ishihara, Ibaraki (JP); Mitsuyuki Tokusashi, Miyagi (JP)

(73) Assignee: Sony Computer Entertainment Inc., Tokyo (JP)

( * ) Notice: Subject to any disclaimer, the term of this patent is extended or adjusted under 35 U.S.C. 154(b) by 1111 days.

(21) Appl. No.: 11/077,979

(22) Filed: Mar. 11, 2005

(65) Prior Publication Data

US 2005/0205441 A1 Sep. 22, 2005

(30) Foreign Application Priority Data

| Mar. 12, 2004 | (JP) | ............................. 2004-071418 |
| Mar. 29, 2004 | (JP) | ............................. 2004-095865 |
| May 10, 2004 | (JP) | ............................. 2004-140482 |
| Sep. 17, 2004 | (JP) | ............................. 2004-272526 |

(51) Int. Cl.
  B65D 85/30 (2006.01)
  B65D 85/57 (2006.01)
(52) U.S. Cl. ................................... 206/308.1; 206/307
(58) Field of Classification Search ................. 206/307, 206/308.1, 308.2, 307.1
  See application file for complete search history.

(56) References Cited

U.S. PATENT DOCUMENTS

| 4,635,792 A | * | 1/1987 | Yamada et al. ............ 206/308.1 |
| 4,702,369 A | * | 10/1987 | Philosophe .................. 206/312 |
| 5,456,368 A | | 10/1995 | Zehnder |
| 5,515,967 A | | 5/1996 | Fitzsimmons et al. |
| 6,164,446 A | * | 12/2000 | Law ........................ 206/308.1 |

(Continued)

FOREIGN PATENT DOCUMENTS

CN  1345066  4/2002

(Continued)

OTHER PUBLICATIONS

Notification of Transmittal of the International Search Report and the Written Opinion of the International Searching Authority dated Jun. 28, 2005.

(Continued)

Primary Examiner—Ehud Gartenberg
Assistant Examiner—Blaine G Neway
(74) Attorney, Agent, or Firm—Katten Muchin Rosenman LLP

(57) ABSTRACT

In a disk containing body including a containing section (1) for containing a disk (D) formed by mounting a disk main body in a cabinet and a lid section (2) for closing a disk receiving aperture of the containing section (1), the containing section (1) has a rising wall (11) that surrounds at least part of the outer periphery of the disk (D) and rises from the bottom surface of the containing section (1), a pair of anchoring claws (12) projecting from the lateral surface of the rising wall (11) toward each other with the disk (D) interposed between them so as to press the contained disk (D) from the aperture side of the containing section (1) toward the bottom surface thereof and a plurality of supporting projections (13) formed at the opposite sides of the line (A) connecting the pair of anchoring claws (12) and adapted to support the disk (D) at the bottom surface thereof.

7 Claims, 33 Drawing Sheets

U.S. PATENT DOCUMENTS

| | | | |
|---|---|---|---|
| 6,454,090 B1* | 9/2002 | Flores et al. | 206/308.1 |
| 6,702,110 B1* | 3/2004 | Flores et al. | 206/310 |
| 6,837,370 B2* | 1/2005 | Shindo et al. | 206/308.1 |
| 2002/0033349 A1 | 3/2002 | Shindo et al. | |
| 2002/0100701 A1* | 8/2002 | Chiu | 206/308.1 |
| 2003/0019772 A1* | 1/2003 | Chan | 206/310 |

FOREIGN PATENT DOCUMENTS

| | | |
|---|---|---|
| EP | 1 014 375 | 6/2000 |
| JP | 7-187273 | 7/1995 |
| JP | 2001-58689 | 3/2001 |
| JP | 2002-96885 | 4/2002 |
| WO | 2004/037679 | 5/2004 |

OTHER PUBLICATIONS

Notification of Reason(s) for Refusal mailed Apr. 8, 2008, from corresponding Japanese Application No. 2004-272526.

Second Office Action dated Aug. 14, 2009, from the corresponding Chinese Application.

* cited by examiner

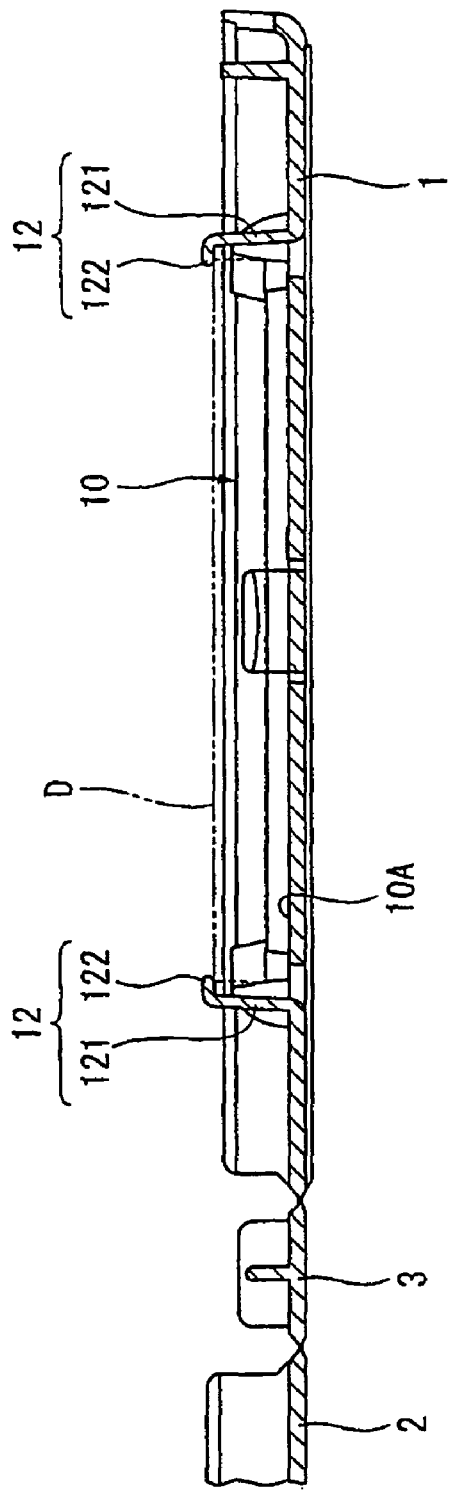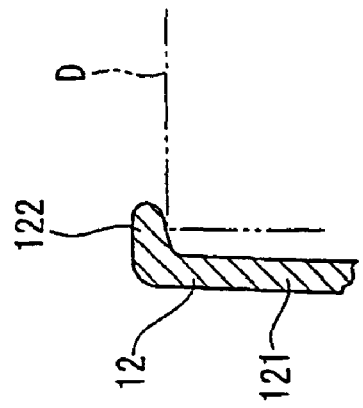

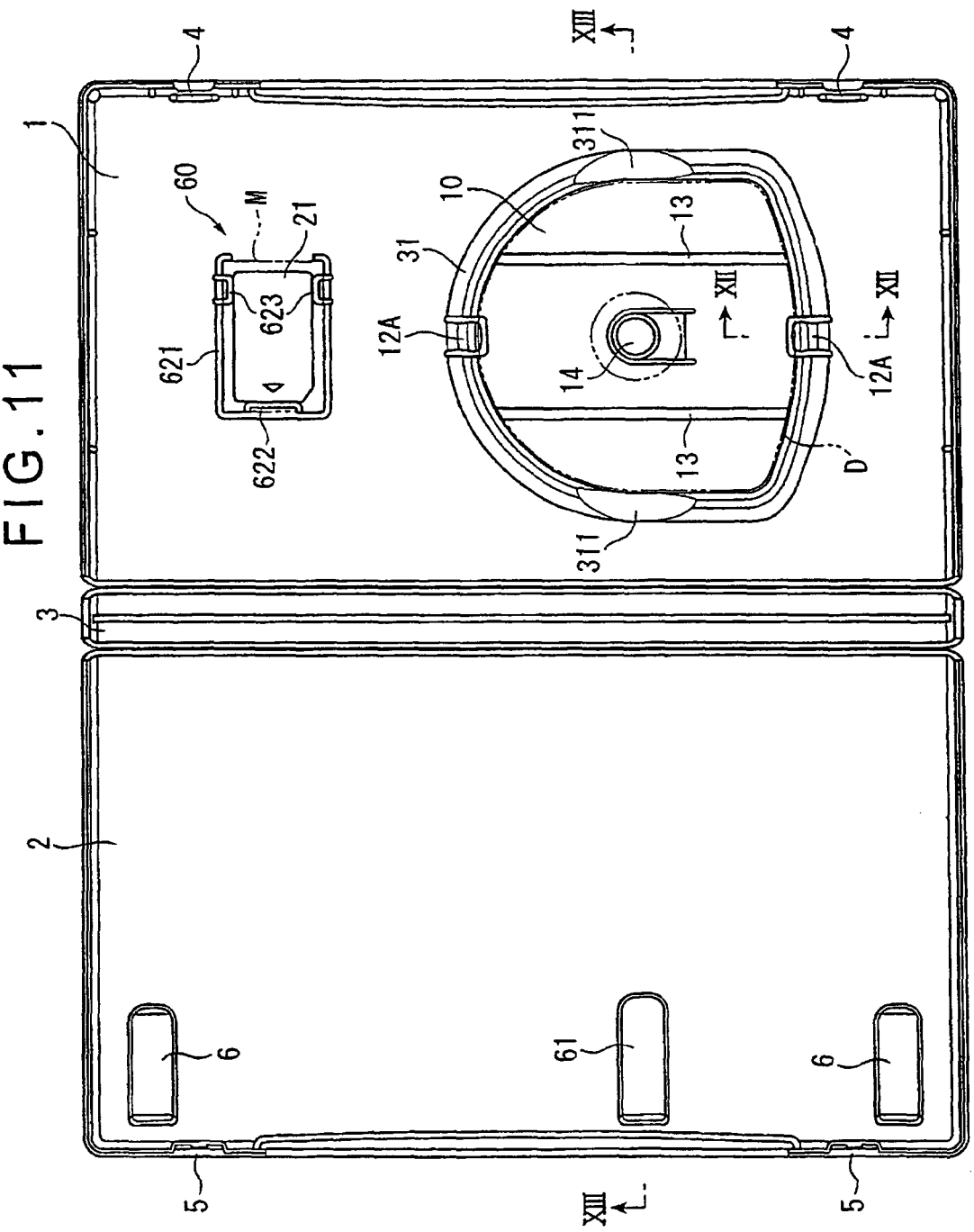

DISK CONTAINING BODY AND INFORMATION PROVIDING BODY

BACKGROUND OF THE INVENTION

1. Field of the Invention

This invention relates to a disk containing body including a containing section for containing a disk having a cabinet and a disk main body mounted in the cabinet, and a lid section for closing a disk receiving aperture of the containing section, and also to an information providing body having such a disk containing body.

2. Description of the Related Art

In recent years, optical disks such as CDs (compact disks) and DVDs (digital versatile disks) have become very popular as recording mediums for recording pieces of software including sound information, video information and games. Optical disks storing recorded sound information, video information and so on and packed in respective cases have been and being widely distributed as alternatives for video tapes.

Known cases of such optical disks include those having a containing section for containing a disk and a lid section for closing a disk receiving aperture of the containing section, the containing section and the lid section being formed integrally by molding, of which the containing section is provided with a flexible engaging piece to be engaged with a center bole of the optical disk (see, for example, Japanese Patent Laid-Open Publication No. 2001-58689 (FIG. 1, ABSTRACT, etc.)).

At the time of taking out the optical disk from the case, the engaging piece is pressed and deformed to allow the optical disk to be disengaged from the engaging piece.

Meanwhile, known optical disks include those provided with a cabinet in which a disk main body is mounted such as magneto-optical disks in other words, in such optical disks, the disk main body is not exposed. When the optical disk provided with the cabinet is contained, an engaging piece cannot be brought into engagement with a center hole of the disk main body. When such an optical disk is simply contained in a case, the optical disk contained in the inside of the case may move when the case is being transported. The inside of the case may have to be filled with a packing material to prevent the optical disk from moving in the inside of the case. Then, the packaging operation may be time consuming and trash can be produced after taking out the optical disk.

A technique of arranging walls or a recess in the case to surround the disk and prevent the optical disk mounted in the case from moving may be conceivable. Then, however, the optical disk has to be mounted in the case with little clearance in order to prevent it from moving in the case. Such an arrangement entails a problem that it is difficult to take out the optical disk from the case.

SUMMARY OF THE INVENTION

A major object of the present invention is to provide a disk containing body that can contain a disk provided with a cabinet, in which a disk main body is mounted, without requiring a time-consuming packaging operation and an information providing body having such a disk containing body.

The disk main body may be an optical disk such as a CD, a CD-ROM, a CD-R, a CD-RW, a DVD-ROM, a DVD-R, a DVD-RW, a DVD+R, a DVD+RW or a DVD-RAM, an MO disk (magneto-optical disk), a magnetic disk or a record.

The disk containing body according to the present invention has a containing section for containing a disk formed by mounting a disk main body in a cabinet; and a lid section for closing a disk receiving aperture of the containing section. The containing section has: a rising wall surrounding at least part of the outer periphery of the disk main body and rising from the bottom surface of the containing section; at least two anchoring claws for holding the contained disk, the anchoring claws being formed to project from the lateral surface of the rising wall at positions opposite to each other with the disk interposed between them; and a plurality of supporting projections formed at positions separated from the line connecting the anchoring claws and supporting part of the bottom surface of the disk.

An information providing body according to the present invention provides information to an information processing apparatus. The information providing body has a disk storing information to be provided to the information processing apparatus; and a disk containing body for containing the disk; in which the disk containing body is a disk containing body according to the present invention, and the disk is contained in the containing section.

BRIEF DESCRIPTION OF THE DRAWINGS

FIG. 2A is a cross sectional view of the first embodiment taken along line II-II in FIG. 1;

FIG. 2B is a cross sectional view of the first embodiment, showing a principal part of FIG. 2A;

FIG. 11 is a schematic plan view of a fifth embodiment of disk containing body, showing its structure;

DETAILED DESCRIPTION OF PREFERRED EMBODIMENT(S)

Now, preferred embodiments of the present invention will be described in greater detail by referring to the accompanying drawings.

1st Embodiment

Figure 1:
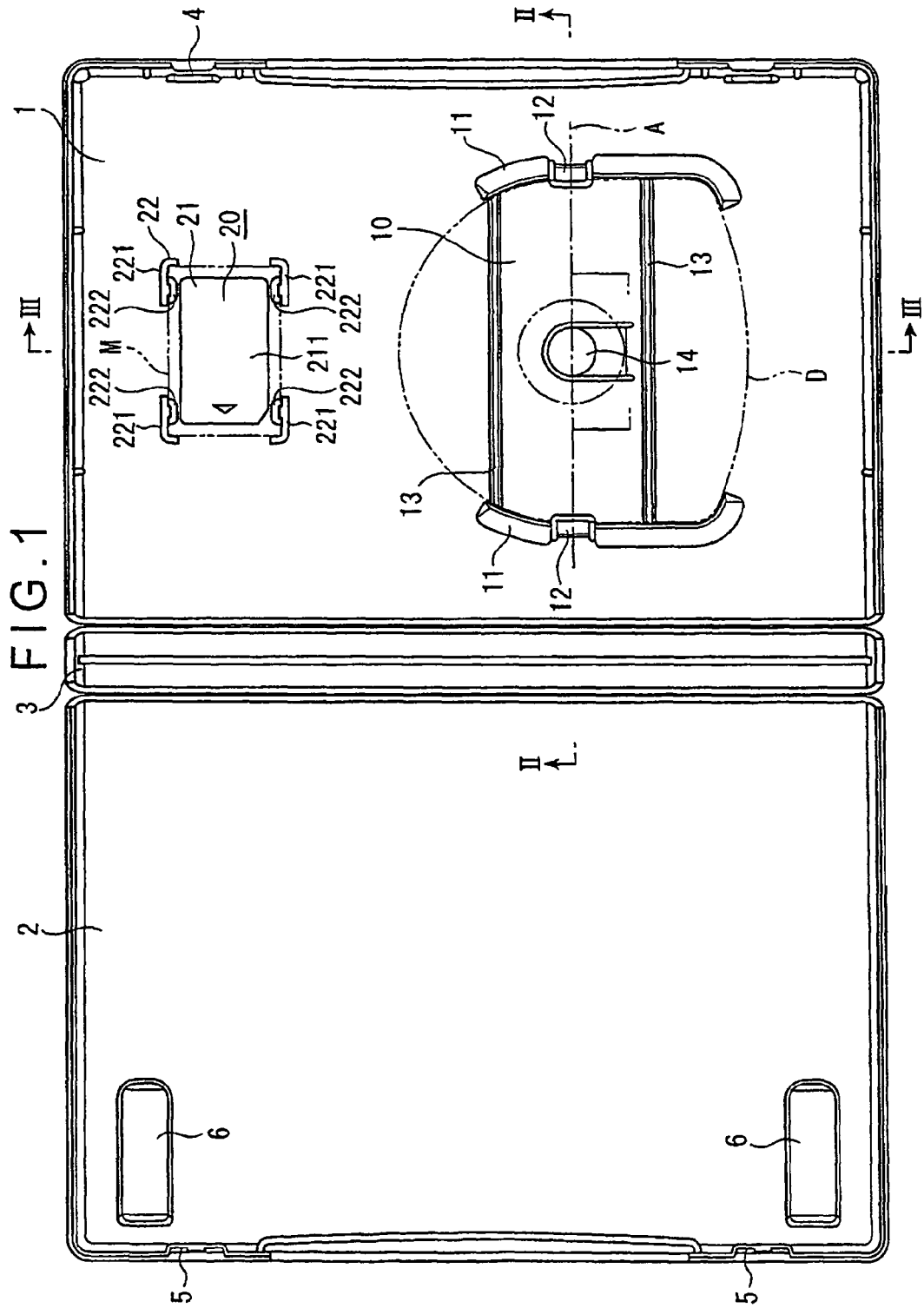
FIG. 1 is a schematic plan view of a first embodiment of disk containing body, showing its structure.

FIGS. 1 through 6 schematically illustrate the first embodiment of the present invention. FIG. 1 shows a disk case which is the first embodiment of disk containing body according to the present invention. The disk case contains an optical disk on which a game program or video information is recorded.

The disk case comprises a containing section 1 for containing an optical disk D and a lid section 2 for closing the aperture of the containing section 1 for receiving the disk. The containing section 1 and the lid section 2 are linked to each other by a belt-shaped section 3 that is located substantially at the middle. The boundary of the belt-shaped section 3 and the containing section 1 and the boundary of the belt-shaped section 3 and the lid section 2 show respective hinge structures so that the lid section 2 can be turned toward the containing section 1 around the belt-shaped section 3, which operates as fulcrum for rotating the lid section 2, to fully close the containing section 1.

The edge wall of the containing section 1 located opposite to the edge wall thereof that is linked to the belt-shaped section 3 is provided at the inside thereof with two engaging grooves 4. On the other hand, the edge wall of the lid section 2 located opposite to the edge wall thereof that is linked to the belt-shaped section 3 is provided with engaging projections 5. Thus, when closing the containing section 1 by the lid section 2, the engaging projections 5 are pushed into the respective engaging grooves 4 for mutual engagement in order to firmly close the disk case.

The lid section 2 is provided on the inner surface thereof with two claws 6, which show an L-shaped lateral view, at positions located near the edge wall where the engaging projections 5 are formed. The letter of instructions for the operation of the game program, the leaflet of the movie or the like may be held by the claws 6.

The containing section 1 contains an optical disk D and has a disk containing section 10 for receiving the optical disk D and an external memory containing section 20 for containing an external memory M.

Although not shown in the drawings, the optical disk D includes a cabinet made of synthetic resin and showing a shield-like plan view that contains a disk main body in the inside, which has a circular contour by definition. The disk main body that is contained in the inside is an optically readable type disk having a circular contour and can record video information such as a game program or a moving picture. Although not shown in the drawings, a synthetic-resin-made cabinet is provided at a lateral edge thereof with a shutter so that, when the optical disk D is mounted in an electronic appliance, the shutter is flung open to allow the information recorded on the disk main body to be optically read.

As shown in FIG. 1, the disk containing section 10 has in the inside thereof a containing space whose profile matches the profile of the cabinet of the optical disk D and a pair of rising walls 11 to surround the outer peripheral edges of the containing space having a shield-like profile. The rising walls 11 extend along the lateral edges of the shield-like profile of the optical disk D and one of the opposite ends of each of the rising walls 11 is bent to receive part of the arc-shaped lower part of the shield-like cabinet while the other end is also bent to receive part of the upper edge of the shield-like cabinet. The rising walls 11 can be formed by raising part of the bottom surface of the synthetic-resin-made containing section 1. In other words, they can be formed integrally with the disk case when the disk case is formed by injection molding.

The paired rising walls 11 are provided substantially at the middles thereof with a pair of anchoring claws 12 arranged vis-à-vis and projecting inwardly respectively from the corresponding lateral wall surfaces with the contained optical disk D interposed between them. The line A that connects the paired anchoring claws 12 runs through the rotary center of the disk main body of the contained disk D (substantially the center of a movement restricting section 14 which will be described hereinafter).

The anchoring claws 12 are components for pressing the contained optical disk D from the aperture side toward the bottom surface side of the containing section 1 so as to rigidly hold it in position. As shown in FIG. 2A, each of the anchoring claws 12 has a base section 121 rising from a bottom surface 10A of the disk containing section 10 and a claw section 122 formed by bending the base section 121 at the front end thereof. As shown in FIG. 2B, the abutting surface of the claw section 122 that abuts the optical disk D is inclined downwardly from the front end of the claw section 122 toward the base section 121 so as to approach the bottom surface of the containing section 1.

As shown in FIG. 1, a pair of supporting projected ridges 13 is formed integrally with the bottom surface of the containing section 1 as supporting projections at respective positions that are separated from each other and located at the opposite sides of the line A connecting the anchoring claws 12.

The supporting projected ridges 13 abut the lower surface of the cabinet of the optical disk D contained in the disk containing section 10 in order to support the optical disk D in a state suspended above and away from the bottom surface of the disk containing section 10. The supporting projected ridges 13 extend along the line A and are arranged at respective positions that make them symmetrical relative to the line A. Additionally, the supporting projected ridges 13 substantially equally divide the length of the optical disk D as viewed in the direction perpendicular to the line A by three. The supporting projected ridges 13 are also integrally formed with the disk case by injection molding.

Figure 3:
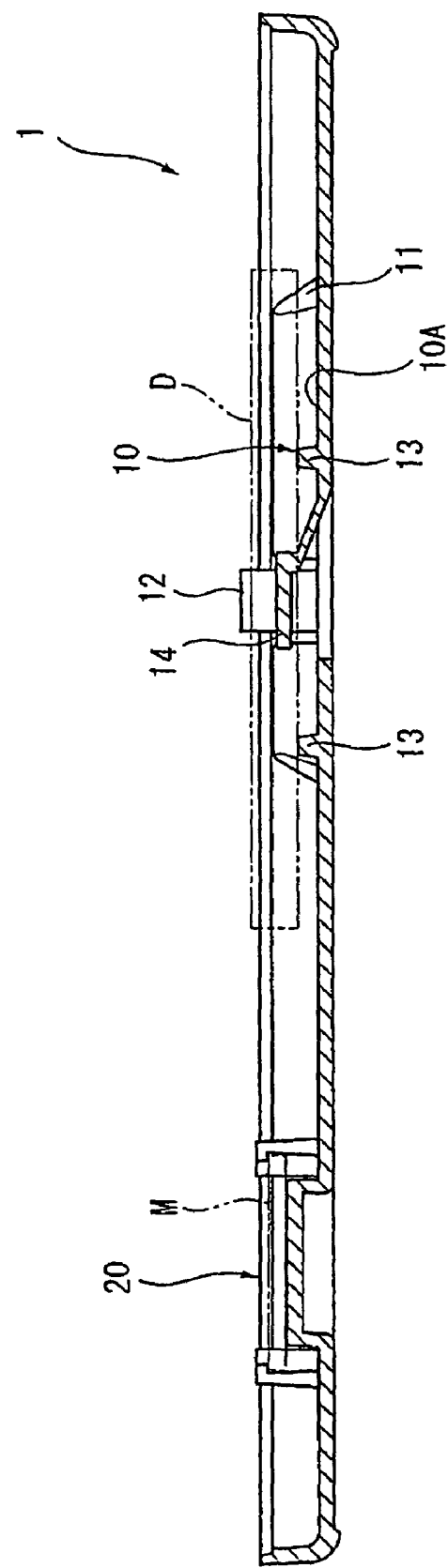
FIG. 3 is a cross sectional view of the first embodiment taken along line III-III in FIG. 1.

As shown in FIG. 3, a movement restricting section 14 is formed at a position corresponding to the rotary center of the optical disk D through which the line A passes so as to rise from the bottom surface 10A of the disk containing section 10. The movement restricting section 14 is formed by cleaving part of the bottom surface 10A of the disk containing section 10 and making it upwardly project away from the bottom surface.

Figure 4:
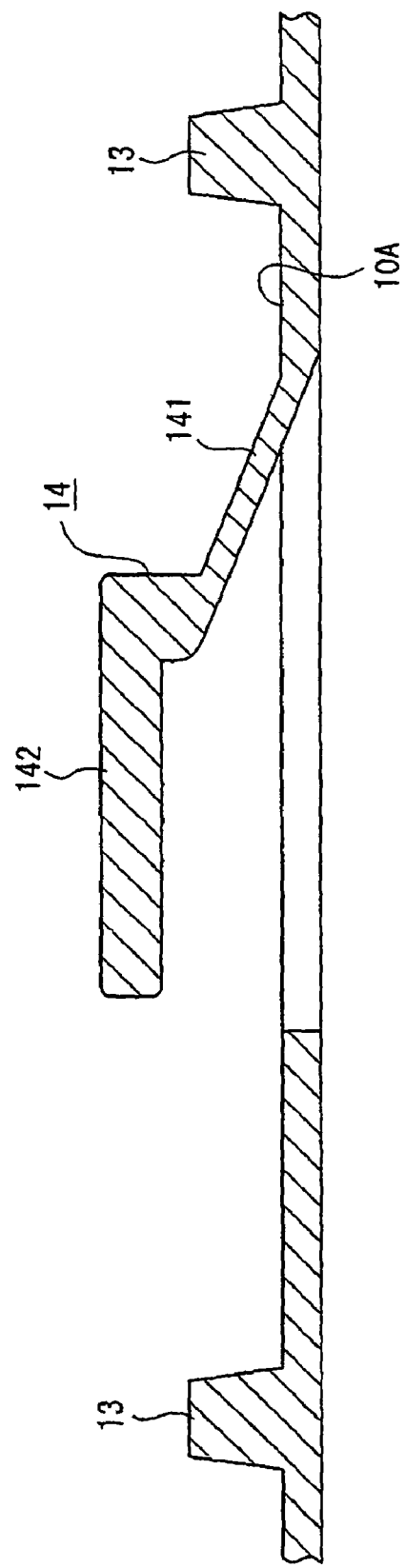
FIG. 4 is a cross sectional view of the first embodiment, showing a principal part of FIG. 3.

More specifically, as shown in FIG. 4, the movement restricting section 14 has an arm section 141 upwardly rising aslant from the bottom surface 10A of the disk containing section 10 and an abutting section 142 substantially horizontally extending from the front end of the arm section 141.

The arm section 141 is made of synthetic resin and formed by cleaving part of the bottom surface 10A of the disk containing section 10 so as to rise upward and away from the bottom surface and show a thickness smaller than that of the bottom surface 10A. It is adapted to be resiliently deflected when force is applied to the abutting section 142 so as to move the section 142 away from the bottom surface.

When the optical disk D is mounted in the disk containing section 10, the abutting section 142 abuts the center hole part of the disk main body that is contained in the inside of the cabinet. As the abutting section 142 abuts the center hole part of the disk main body, the arm section 141 is deflected toward the bottom surface 10A and the disk main body is urged upwardly by the resilient force of the deflected arm section 141 to consequently abut the inner surface of the cabinet of the optical disk D and restrict any movement of the disk main body.

Figure 5:
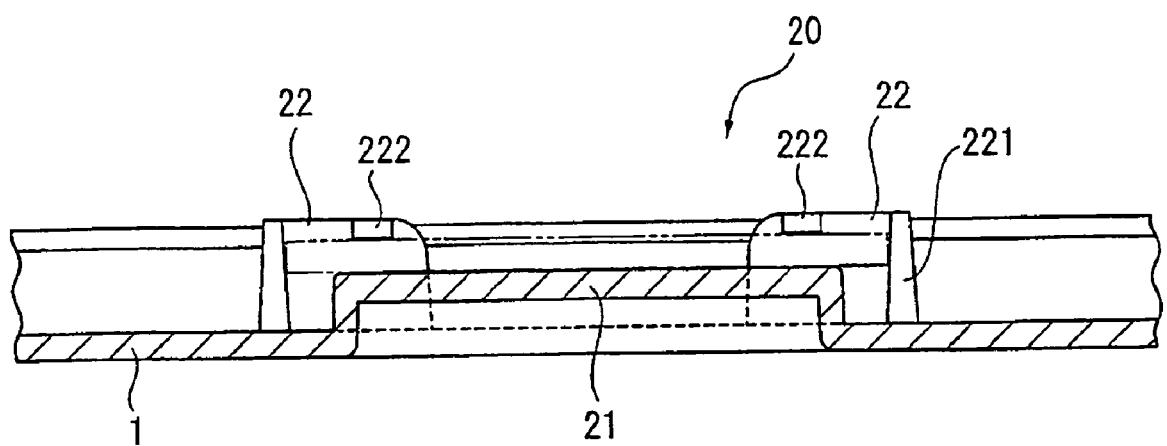
FIG. 5 is a cross sectional view of the first embodiment, also showing a principal part of FIG. 3.

A memory containing section 20 is formed adjacent to the disk containing section 10 having the above described configuration. As shown in FIGS. 1 and 5, the memory containing section 20 includes a seat 21 and engaging sections 22. The memory M that is to be mounted in the memory containing section 20 includes a circuit substrate carrying a flash memory or the like and a cover case showing a rectangular contour in plan view. The cover case is chamfered at a corner thereof to provide a connecting edge to be connected to an electronic appliance in order to the memory from being inserted into the electronic appliance in a wrong way.

The seat 21 is formed by making part of the bottom surface of the containing section 1 protrude away from the bottom surface and includes a supporting surface 211 that is slightly smaller than the contour of the memory M to be mounted therein. The supporting surface 211 is provided with an arrow sign indicating the direction in which the memory M is to be mounted.

As shown in FIG. 1, the engaging sections 22 are made to show an L-shaped profile so as to respectively match the profiles of the four corners of the cover case of the memory M to be mounted and rise upward from the bottom surface of the containing section 1 like so many walls.

As shown in FIG. 5, each of the engaging sections 22 includes a rising piece 221 rising from the bottom surface of the containing section 1 and an anchoring claw 222 formed at the top end of the surface of the corresponding rising piece 221 that faces the longitudinal direction of the memory M so as to abut the memory M.

When the memory M is contained in the memory containing section 20, the memory M is forced to slide at the front end thereof in the direction indicated by an arrow sign 212 and subsequently press the base end side of the memory M against the supporting surface 211 of the seat 21. Then, the front surface of the memory M may be blocked by parts of the corresponding anchoring claws 222. However, as the rising pieces 221 are deflected outwardly to broaden the gap between them, the memory M can override the anchoring claws 222. Once the memory M overrides the anchoring claws 222, it restores the original postures and the memory M is mounted properly in and held by the memory containing section 20.

Now, the effects of the first embodiment of disk case will be described below.

Firstly, when mounting the optical disk D in the disk containing section 10, the arc-shaped part of the shield-like cabinet is inserted into the disk containing section 10 and forced to slide until the anchoring claws 12 become engaged with the lateral edges of the cabinet of the optical disk D and the optical disk D is rigidly held in position.

Figure 6:
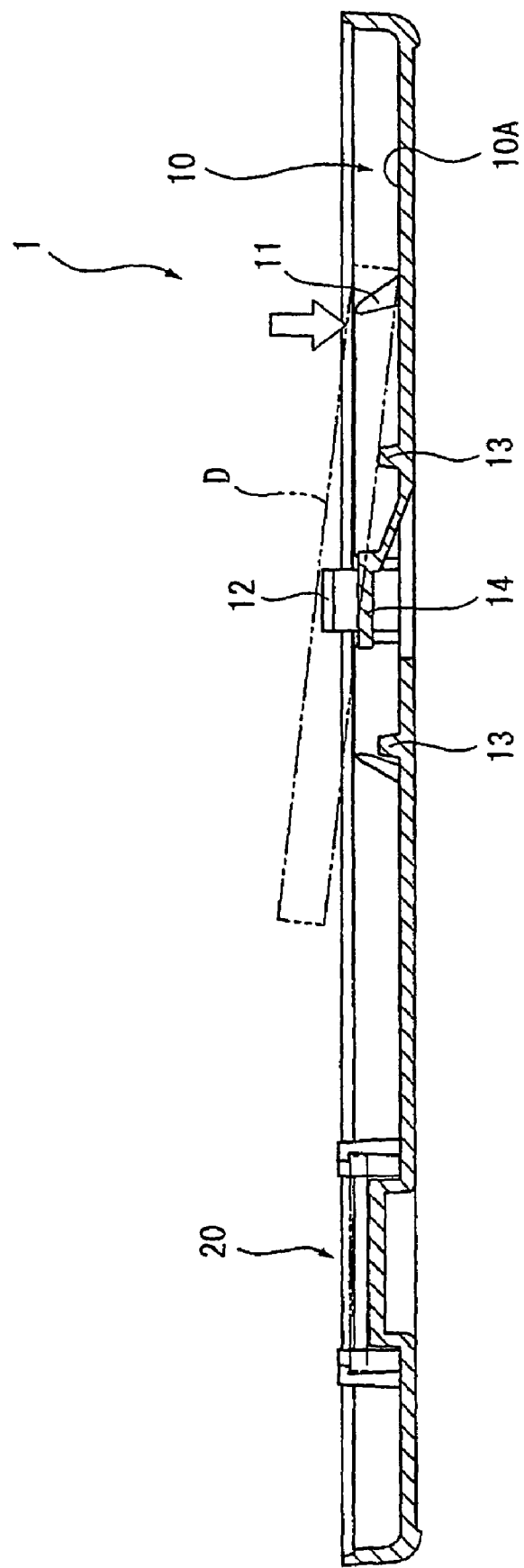
FIG. 6 is a cross sectional view of the first embodiment, illustrating the effect thereof.

When taking out the optical disk D from the disk containing section 10, pressure for pressing an upper edge part of the shield-like optical disk D against the bottom surface 10A of the disk containing section 10 is applied from above as shown in FIG. 6.

Then, a force trying to rotate the optical disk D around the top surface of one of the supporting projected ridges 13, which operates as fulcrum, is effected to generate a force for raising the anchoring parts of the anchoring claws 12. As a result, the optical disk D is disengaged from the anchoring claws 12 and then the front end of the optical disk D is raised above the upper edge of the rising walls 11 by the upward urging force of the movement restricting section 14. However, it may alternatively be so arranged that the front end of the optical disk D is raised upward while the lateral edges of the optical disk D are held by the anchoring claws 12. Such an arrangement goes well when the anchoring claws 12, the supporting projected ridges 13 and the corresponding ends of the disk containing section 10 are aligned in the straight line.

Then, a user takes out the optical disk D from the disk containing section 10, holding the raised part of the optical disk D. Alternatively, the optical disk D can be taken out by following to the above described procedure if the edge of the arc-shaped part is pressed toward the bottom surface 10A of the disk containing section 10 from above because the other supporting projected ridge 13 is arranged at the symmetrical position relative to the line A connecting the anchoring claws 12.

The above described embodiment provides the following advantages.

Since the optical disk D is rigidly held in the inside of the disk containing section 10 in a state where the optical disk D is seized by the rising walls 11 and the anchoring claws 12, the optical disk D does not move when it is being transported. In other words, the optical disk D can be contained without any risk of moving in the disk case so that it is not necessary to prepare packaging members separately. On the other hand, since the optical disk D is supported by the supporting projected ridges 13 projecting from the bottom surface 10A of the disk containing section 10 and the supporting projected ridges 13 are separated from the line connecting the anchoring claws 12, the anchoring claws 12 are disengaged from the optical disk D and the optical disk D can be easily taken out from the disk containing section 10 simply by pressing an edge of the optical disk D due to the lever effect.

Since the supporting projected ridges 13 are formed to run along the line A connecting the anchoring claws 12, a force trying to disengage the anchoring claws 12 is effected simply by pressing the optical disk D at any edge part thereof located off the line A so that the optical disk D can be taken out from the disk containing section 10 very easily.

Since the supporting projected ridges 13 are formed at substantially symmetrical positions relative to the line A connecting the anchoring claws 12, the force applied by the anchoring claws 12 to press the mounted optical disk D toward the bottom surface 10A is borne evenly by the two supporting projected ridges 13 in a distributed manner so that the optical disk D can be rigidly and very reliably held in the disk containing section 10.

Since the surface of claw section 122 of each of the anchoring claws 12 that abuts the cabinet of the optical disk D is inclined toward the outside of the optical disk D and hence toward the bottom surface 10A of the disk containing section 10 as it approaches the base section 121, the claw section 122 reliably abuts the top surface of the cabinet if the thickness of the cabinet of the optical disk D is not accurate so that the optical disk D can be rigidly and very reliably held in the disk containing section 10.

Since the disk containing section 10 has a movement restricting section 14, the disk main body is pressed against the inner surface of the cabinet by the urging force exerted by the movement restricting section 14 when the optical disk D is mounted in the disk containing section 10 so that the disk main body is prevented from moving in the cabinet and hence the disk main body does not move to give rise to noise if the disk case of the mounted optical disk D is shaken.

Since a memory containing section 20 is formed in the containing section 1 of the disk case, if the optical disk D stores a game program or a similar piece of software, it is possible to record the progress of the game in a memory M and mount the memory M, in which the progress is recorded, in the memory containing section 20 anytime thereafter in order to conveniently use the memory M mounted in the memory containing section 20 when resuming the game.

Thus, the present embodiment has, based on the present invention, its own advantages as described below:

A disk containing body according to an aspect of the present invention has: a containing section for containing a disk formed by mounting a disk main body in a cabinet, and a lid section for closing a disk receiving aperture of the containing section. The containing section having: a plurality of flexible anchoring claws rising from the bottom surface of the containing section at positions located along the outer periphery of the contained disk and rigidly holding the contained disk in the containing section and a supporting projection rising from the bottom surface of the containing section and supporting the contained disk in a state of being suspended from the bottom surface of the containing section.

Thus, according to the invention, the disk contained in the containing section is supported by the supporting projection in a state of being suspended from the bottom surface of the containing section and pressed toward the bottom surface of the containing section so as to be rigidly held in position by the plurality of anchoring claws. With this arrangement, a user can touch the edge of the disk from any position of the containing section except the positions where the anchoring claws are arranged so that he or she can easily take out the disk contained in the containing section.

More specifically, since the disk is supported by the supporting projection in a state of being suspended from the bottom surface of the containing section, the finger of the user trying to taking out the disk from the containing section touches the edge and part of the bottom surface of the disk so that he or she can lift the disk upward with ease. Therefore, the user can take out the disk from the containing section very easily.

Preferably, in the present invention, when the disk stores a program that can be executed by an electric appliance and the state of progress of the program can be stored in another recording medium, a recording medium receiving section is provided to receive the recording medium at a position separated from the position of the containing section for containing the disk.

The recording medium for storing the state of progress of the program may be a small storage memory such as a flash memory.

Thus, if the disk stores a game program or the like and a recording medium receiving section is provided according to the present invention, it is highly convenient to record the state of progress of the game on the recording medium and the recording medium is held in the recording medium receiving section because it can be handled appropriately depending on the game.

2nd Embodiment

Figure 7:
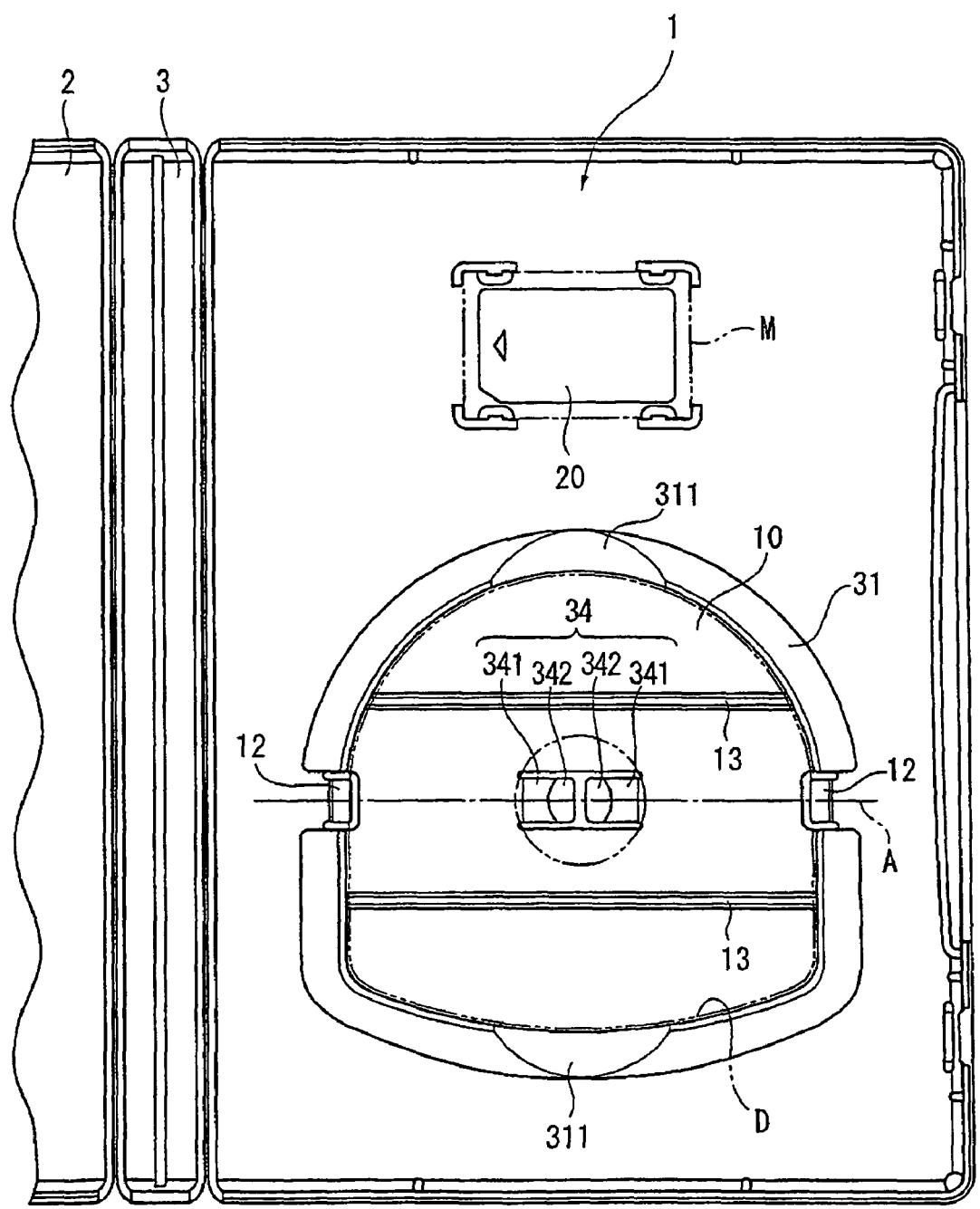
FIG. 7 is a schematic plan view of a second embodiment of disk containing body, showing its structure.

FIG. 7 shows the second embodiment. Descriptions will be given with reference to FIG. 7 and the components of the second embodiment same as or similar to those of the above-described first embodiment are denoted respectively by the same reference symbols and will not be described any further.

The disk containing section 10 of the disk case of the first embodiment is provided with a pair of rising walls 11 that extends along the respective lateral edges of the shield-like optical disk D.

Of the movement restricting section 14 of the disk case of the above described first embodiment, the arm section 141 is adapted to operate like a cantilever to support the abutting section 142 having a circular contour in plan view.

As shown in FIG. 7, the disk case of the second embodiment differs from that of the first embodiment in that a rising wall 31 is provided to substantially entirely surround the optical disk D along the outer periphery thereof.

Additionally, the movement restricting section 34 of the second embodiment differs from that of the first embodiment in that it has two semicircular abutting sections 342 that project away from the bottom surface 10A of the disk containing section 10 as they are supported by respective arm sections 341.

The above listed differences will be described in greater detail below.

As shown in FIG. 7, the rising wall 31 has a contour line that matches the shield-like profile of the optical disk D except parts thereof where the anchoring claws 12 are arranged.

The top end of the rising wall 31 is made to show such a height that, when the optical disk D is mounted, the top surface of the optical disk D is located below the top end. The rising wall 31 is provided at opposite ends thereof, the line connecting the opposite ends being perpendicular relative to the line connecting the paired anchoring claws 12, with respective recesses 311 that are lower than the top end of the rising wall 31 so as to expose the lateral surface of the optical disk D.

The movement restricting section 34 includes a pair of inclined arm sections 341 arranged vis-à-vis along the line connecting the anchoring claws 12 and projecting upward and a pair of semicircular abutting sections 342 arranged at the tops of the respective arm sections 341. A gap is formed between the abutting sections 342 so that, when the optical disk D is mounted and the abutting sections 342 are deformed to show a low profile by the pressure applied by the optical disk D, the abutting sections 342 would not interfere with each other.

When taking out the optical disk D from the disk containing section 10, the optical disk D is pressed downward at an end part thereof located at the position corresponding to one of the recesses 311 of the rising wall 31 to turn around one of the supporting projected ridges 13, which operates as fulcrum, as in the case of the first embodiment.

The above described disk case of the second embodiment provides the advantages as listed below in addition to the advantages of the first embodiment as described earlier.

Since the rising wall 31 is formed to substantially entirely surround the optical disk D along the outer periphery thereof, the disk containing section 10 is reinforced by the rising wall 31 to improve the overall strength of the containing section 1 so that the disk case would not be deformed if external force is applied to the disk case after mounting the optical disk D and hence the optical disk D mounted in the inside is protected reliably.

Additionally, since recesses 311 are formed at part of the rising wall 31, the user can clearly see where he or she has to press when taking out the optical disk D that is mounted in the inside to a great convenience on the part of the user.

3rd Embodiment

Figure 8:
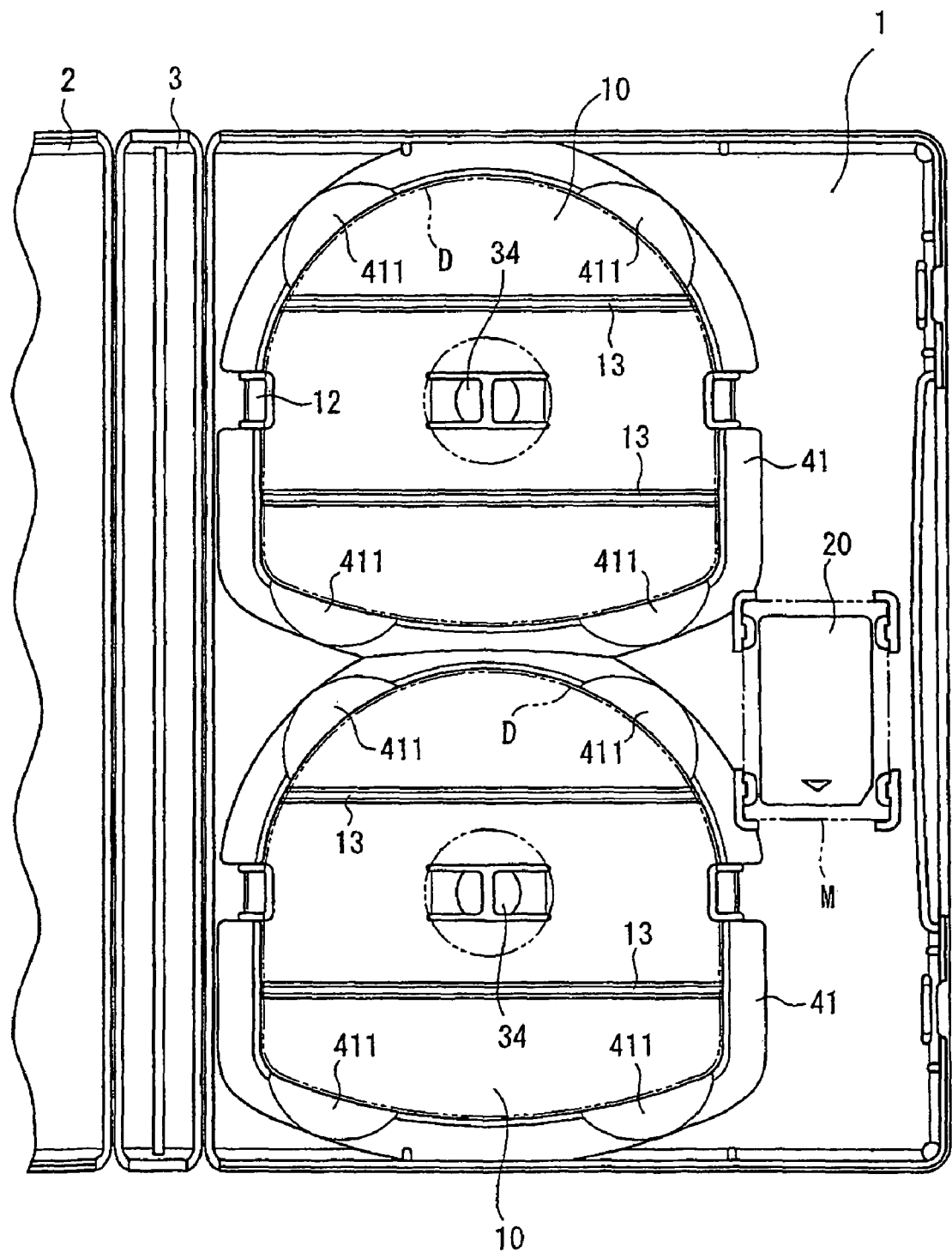
FIG. 8 is a schematic plan view of a third embodiment of disk containing body, showing its structure.

FIG. 8 illustrates the third embodiment.

The disk case of the above-described second embodiment contains a single optical disk D in the single case.

The third embodiment differs from the second embodiment in that the disk case of the third embodiment is adapted to contain two optical disks D as shown in FIG. 8.

More specifically, the disk case of the third embodiment comprises two disk containing sections 10 and a single memory containing section 20.

Each of the disk containing sections 10 has a rising wall 41 formed to substantially entirely surround an optical disk D along the outer periphery thereof and the two rising walls 41 are linked to each other substantially at the center of the containing section 1.

While the height of the rising walls 41 from the bottom surface of the disk containing section 10 is substantially the same as that of the rising wall of the second embodiment, the third embodiment differs from the second embodiment in that the rising walls 41 of the third embodiment are provided with recesses 411 that are formed at positions different from those of the second embodiment. In other words, each of the rising walls 41 is provided with four recesses that are arranged near the four corners of the shield-like profile thereof. The height of the recesses 411 from the bottom surface of the disk containing section 10 is the same as that of the second embodiment so that when optical disks D are mounted, the cabinet lateral surfaces of the optical disks D are exposed.

The above-described disk case of the third embodiment provides the advantages as listed below in addition to the advantages of the first and second embodiments as described earlier.

Since a single disk case contains two optical disks D, it can effectively contain a series of optical disks D that store a super-movie-production or a voluminous game program.

Since the optical disk receiving/ejecting structure of the disk case of the third embodiment does not differ from that of the first or second embodiment that is adapted to contain a single optical disk, the disk case of the third embodiment can be stored in an optical disk rack with disk cases of other types without any problem.

4th Embodiment

FIGS. 9 and 10A through 10C illustrate the fourth embodiment.

In the disk case of the first embodiment, the optical disk D is rigidly held in position as the optical disk D is urged toward the bottom surface 10A of the disk containing section 10 at the center of the optical disk D by the anchoring claws 12, each of which is arranged substantially at the middle of the corresponding one of the rising walls 11.

Figure 9:
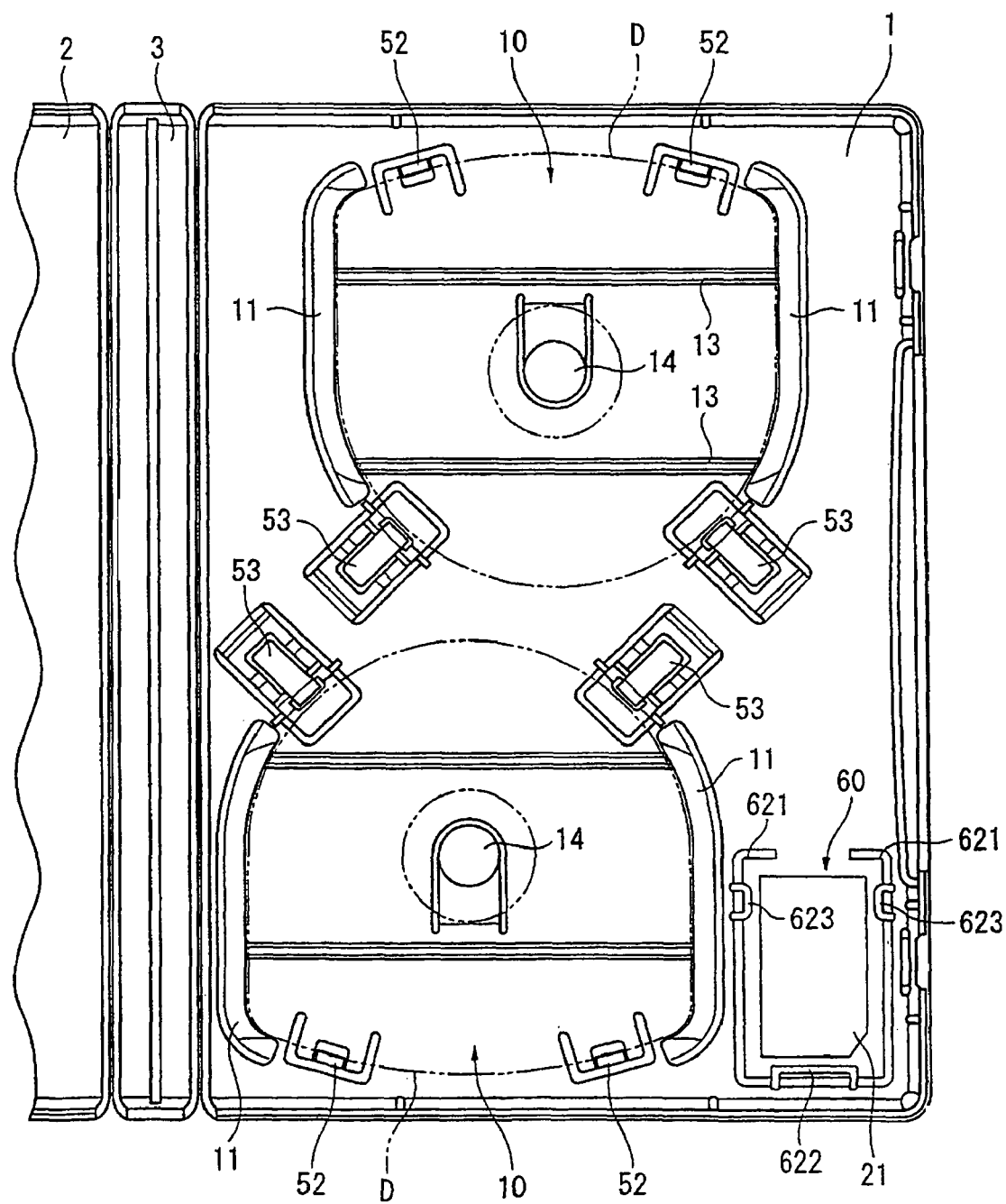
FIG. 9 is a schematic plan view of a fourth embodiment of disk containing body, showing its structure.

As shown in FIG. 9, the disk case of the fourth embodiment differs from the first embodiment in that, each of the contained optical disks D is rigidly held in the corresponding disk containing section 10 by means of two anchoring claws 52 and two anchoring clips 53 that are arranged near the four corners of the disk containing section 10. The anchoring clips 53 are adapted to pinch the optical disk D.

Of the disk case of the first embodiment, the memory containing section 20 has engaging sections 22 arranged at the four corners of the memory M and the memory M is rigidly held in position as it is pressed toward the base seat 21 at the lateral edges of the memory M by the anchoring claws 222 arranged at the respective rising pieces 221 of the engaging sections 22.

The fourth embodiment differs from the first embodiment in that the memory containing section 60 of the disk case of the fourth embodiment has a rising piece 621 that substantially entirely surrounds the base seat 21 along the entire outer periphery thereof and anchoring claws 622, 623 projecting inwardly from the top of the rising piece 621.

Now, the differences will be described in greater detail below.

As shown in FIG. 9, each of the disk containing sections 10 of the disk case of the fourth embodiment has two anchoring claws 52 and two anchoring clips 53 that arranged substantially at the four corners of the contained optical disk D.

Figure 10A:
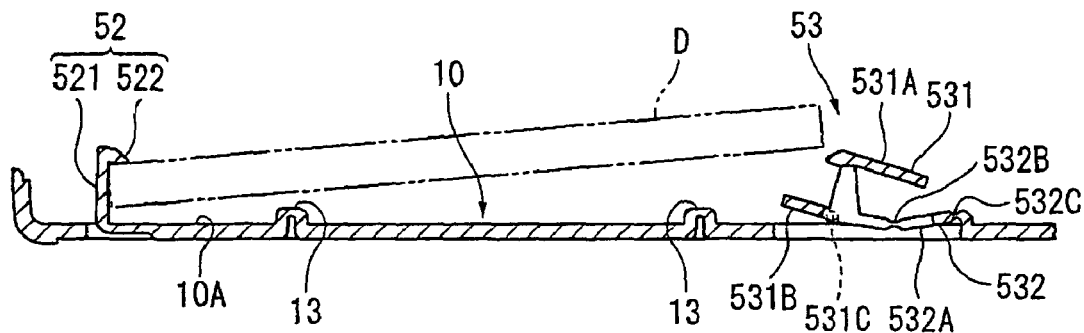
FIGS. 10A, 10B and 10C are cross sectional views of the fourth embodiment, illustrating a disk fitting structure thereof.
Figure 10B:
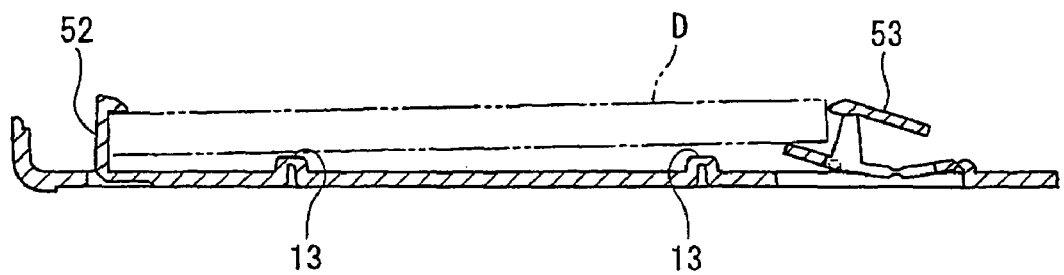
Figure 10C:
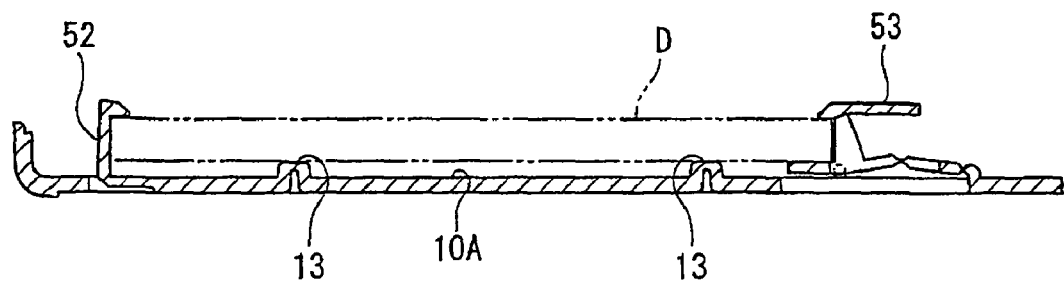

The anchoring claws 52 are arranged respectively near the two opposite ends of the upper edge of the shield-like profile of the contained optical disk D. As shown in FIGS. 10A through 10C, each of the anchoring claws 52 has a base section 521 rising from the bottom surface 10A of the disk containing section 10 and a claw section 522 formed by bending the base section 521 at the front end thereof to the disk containing section 10 side. Note that the anchoring claws 52 are formed integrally with the disk case when it is formed by injection molding as in the case of the anchoring claws 12 of the first embodiment.

As shown in FIG. 9, the anchoring clips 53 are arranged respectively near the opposite ends of the lower arc-shaped part of the shield-like profile of the corresponding optical disk D.

As shown in FIGS. 10A through 10C, each of the anchoring clips 53 has a clip main body 531 that pinches the optical disk D and a link section 532 that links the clip main body 531 and the bottom surface 10A of the disk containing section 10.

The clip main body 531 by turn has a pair of pinching pieces 531A, 531B that are rotatable around an axial section 531C arranged on the bottom surface 10A of the disk containing section 10.

The front end of the upper pinching piece 531A protrudes toward the other pinching piece 531A, while the front end of the lower pinching piece 531B projects in the extending direction thereof than the upper pinching piece 531A.

While the distance separating the paired pinching pieces 531A, 531B is slightly greater than the thickness of the optical disk D, it is reduced to become slightly smaller than the thickness of the optical disk D at the protruding front end of the pinching piece 531A.

With this arrangement, when the optical disk D is pinched by the clip main body 531, the pinching piece 531B is deflected in the direction perpendicular to the optical disk D and the protruding section comes to abut the top surface of the optical disk D pinch to maintain a pinching state.

The link section 532 has a plate-shaped section 532A that is linked to the base end of the lower pinching piece 531B and by turn links the pinching piece 531B and the bottom surface 10A by way of a first hinge section 532B linked to the pinching piece 531B and a second hinge section 532C linked to the bottom surface 10A.

The first hinge section 532B and the second hinge section 532C are formed by thinning the corresponding parts of the plate shaped member extending between the bottom surface 10A and the pinching piece 531B in such a way that the plate-shaped section 532A can be deformed to move away from the bottom surface 10A by means of the first hinge section 532B and the second hinge section 532C.

When the optical disk D is mounted and rigidly held in position by means of the anchoring claws 52 and the anchoring clips 53, the claws 52 and the clips 53 operate as a mechanism like that of a binding mechanism of a ski. More specifically, the following procedure is followed.

(1) Firstly, a user obliquely puts the front end of the optical disk D under the anchoring claws 52 from above and pushes the optical disk D until its front facet is pressed against the base section 521 of each of the anchoring claws 52 (FIG. 10A).

(2) Then, the user lowers the rear end part of the optical disk D toward the bottom surface of the disk containing section 10 until the lower surface of the optical disk D abuts the upper surface of the lower pinching piece 531B of each of the anchoring clips 53 (FIG. 10B).

(3) As the user presses the optical disk D toward the bottom surface 10A further, the clip main body 531 of each of the anchoring clips 53 turns around the axial section 531C and pinches the optical disk D between the first pinching piece 531A and the second pinching piece 531B so that the optical disk D is properly mounted and rigidly held in the disk containing section 10 (FIG. 10C).

When taking out the optical disk D that is mounted and rigidly held in the disk containing section 10, the user pushes the first pinching piece 531A of the clip main body 531 down toward the bottom surface 10A at the outside of the axial section 531C (located opposite to the part pinching the optical disk D) to turn the clip main body 531 around the axial section 531C. Then, the optical disk C turns around the top surface of the supporting projected ridges 13 located close to the anchoring claws 52 so that the user can take out the optical disk D.

Returning to FIG. 9, the memory containing section 60 has a base seat 21 and an engaging section 62 so that the memory is contained in the inside of the engaging section 62.

The engaging section 62 is partly cut out to produce an opening at a position vis-à-vis one of the short sides of the rectangular memory, while the remaining part of the engaging section 62 has a continuous rising piece 621 arranged to surround the base seat 21 and anchoring claws 622, 623 projecting from the top end of the rising piece 621.

The anchoring claw 622 is formed on the short side of the rising piece 621 that is free from the opening so as to press the front end of the memory.

The anchoring claws 623 are two in number and adapted to respectively press the edges of the long sides of the memory. They are arranged opposite to each other at the long sides of the rising piece 621.

When a memory is mounted in the engaging section 62, the user firstly puts the front end of the memory under the anchoring claw 622 and then presses the memory toward the base seat 21 until the anchoring claws 623 are moved away from each other due to the flexibility of the rising piece 621. As the memory comes to abut the base seat 21, the anchoring claws 623 restore the original postures to press and rigidly hold the memory in position.

The above-described fourth embodiment provides the advantages as listed below in addition to the advantages of the preceding embodiments.

Since each of the optical disks D is mounted and rigidly held in the corresponding disk containing section 10 by means of the two anchoring claws 52 and the two anchoring clips 53, the optical disk D is highly rigidly held in position in the disk containing section 10 so that the optical disk D is highly reliably prevented from slipping out from the disk containing section 10 while it is being transported.

Each of the optical disks D can be mounted in and taken out from the corresponding disk containing section 10 very easily and simply by turning the clip main bodies 531 of the anchoring clips 53. Additionally, each of the optical disks D can be taken out without pressing it from above to a great advantage of securely protecting the optical disk D.

Thus, the present embodiment has, based on the present invention, its own advantages as described below:

Preferably, the pair of anchoring claws is formed near one edge of the cabinet of the contained disk and an anchoring section is arranged near other edge opposite to the one edge to pinch the cabinet in thickness direction.

Thus, according to the present invention, the disk is not only pressed and rigidly held by the anchoring claws, but also pinched and rigidly held by the anchoring section so that the disk is highly rigidly held in the containing section-and highly reliably prevented from slipping down during transportation or the like.

5th Embodiment

FIGS. 11 through 14 illustrate the fifth embodiment.

In the disk case of the first embodiment, each of the anchoring claws 12 is arranged substantially at the middle of the corresponding lateral edge of the disk containing section 10 showing a shield-like profile that matches the profile of the optical disk D. The optical disk D is rigidly held in the disk case by the anchoring claws 12.

The disk case of the fifth embodiment differs from that of the first embodiment in that the optical disk D is rigidly held in the disk containing section 10 by anchoring claws 12A, which are arranged respectively substantially at the middle of the upper edge of the disk containing section 10 and at the middle of the arc-shaped part of the section 10 as shown in FIG. 11. Additionally, the disk case of the fifth embodiment differs from that of the first embodiment in that the lid section 2 of the fifth embodiment is provided substantially at the middle thereof with a keeping section 61 for keeping the optical disk D contained in the disk containing section 10 in position and preventing it from slipping out from the section 10. The memory containing section 60 of the embodiment is identical with that of the disk case of the fourth embodiment.

Now, the above listed differences will be described below in detail.

Like the anchoring claws 12 described above, the anchoring claws 12A of this embodiment are adapted to press the contained optical disk D from the aperture side of the containing section 1 toward the bottom surface side thereof and rigidly hold it in position. As shown in FIG. 11, the anchoring claws 12A are arranged respectively substantially at the middle of the upper edge of the disk containing section 10 and at the middle of the arc-shaped part of the section 10, which the section 10 showing a shield-like profile. Thus, the anchoring claws 12A are arranged oppositely relative to each other. More specifically, the anchoring claws 12A are arranged at positions located on the center line that divides the optical disk D showing a shield-like profile into axially symmetrical two parts and adapted to engage with respective end parts of the optical disk D. Additionally, the supporting projected ridges 13 are arranged in parallel with the line connecting the anchoring claws 12A. Still additionally, recesses 311 are formed respectively at the intersections of the line that rectangularly intersects the line connecting the anchoring claws 12A at the center of the disk containing section 10 and the rising wall 31.

Figure 12:
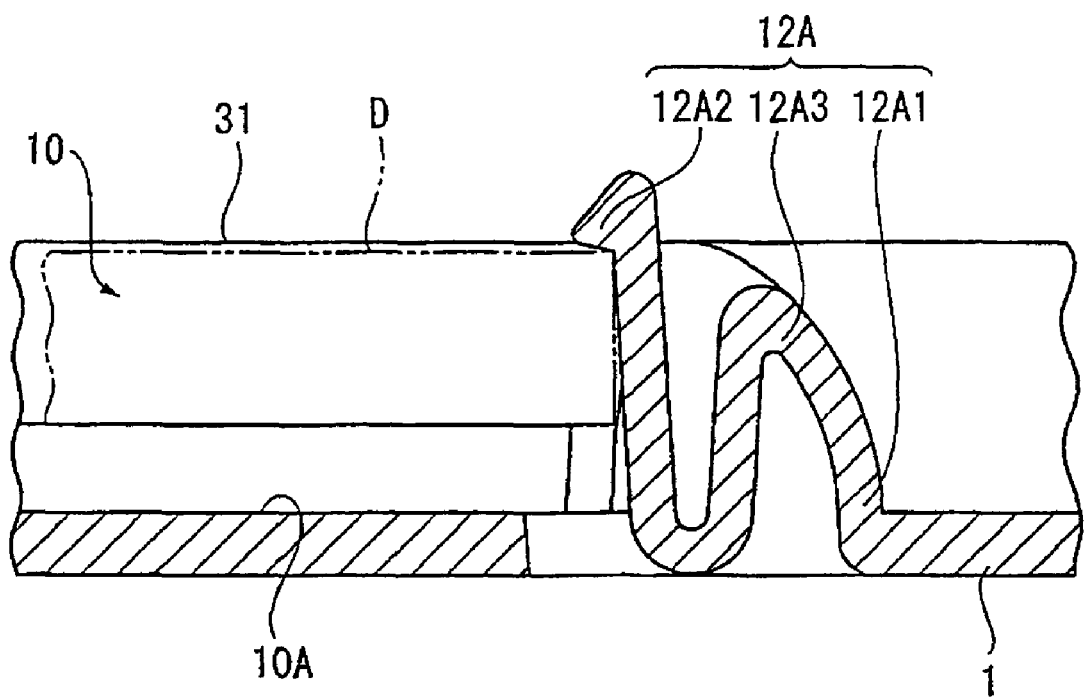
FIG. 12 is a cross sectional view of the fifth embodiment taken along line XII-XII in FIG. 11.

As shown in FIG. 12, each of the anchoring claws 12A has a rising section 12A1 rising from the bottom surface 10A of the disk containing section 10, a claw section 12A2 adapted to abut the optical disk D and a meandering section 12A3 turning in different ways between the rising section 12A1 and the claw section 12A2. As in the case of the claw sections 122 of the above described anchoring claws 12, the abutting surface of the claw section 12A2 that is adapted to abut the optical disk D is inclined downwardly from the front end of the claw section 12A2 toward the meandering section 12A2 to approach the bottom surface of the containing section 1.

The meandering section 12A3 of the anchoring claw 12A is made to turn in different ways from the rising section 12A1 to the claw section 12A2 so as to show a substantially S-shaped cross section. In other words, the meandering section 12A3 is adapted to be deflected outwardly relative to the optical disk D in a radial direction thereof when the optical disk D is contained in the disk containing section 10. The front end of the meandering section 12A3 projects to a position located closer to the center of the disk containing section 10 than the rising wall 31 so that the claw section 12A2 can become engaged with the optical disk D. As in the case of the anchoring claws 12A of the first embodiment, the anchoring claws 12 of this embodiment are formed integrally with the disk case when the disk case is formed by injection molding.

Figure 13:
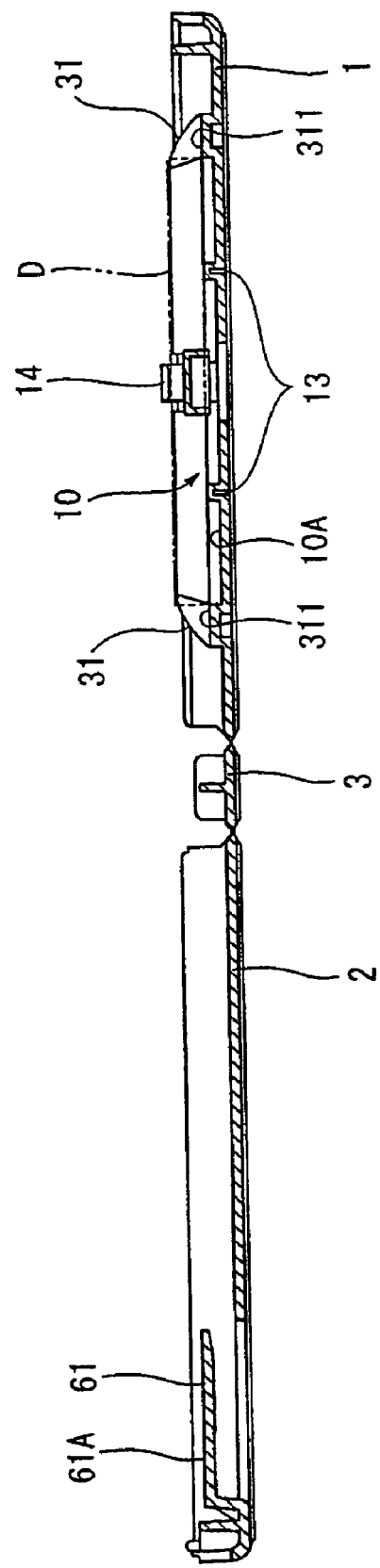
FIG. 13 is a cross sectional view of the fifth embodiment taken along line XIII-XIII in FIG. 11.
Figure 14:
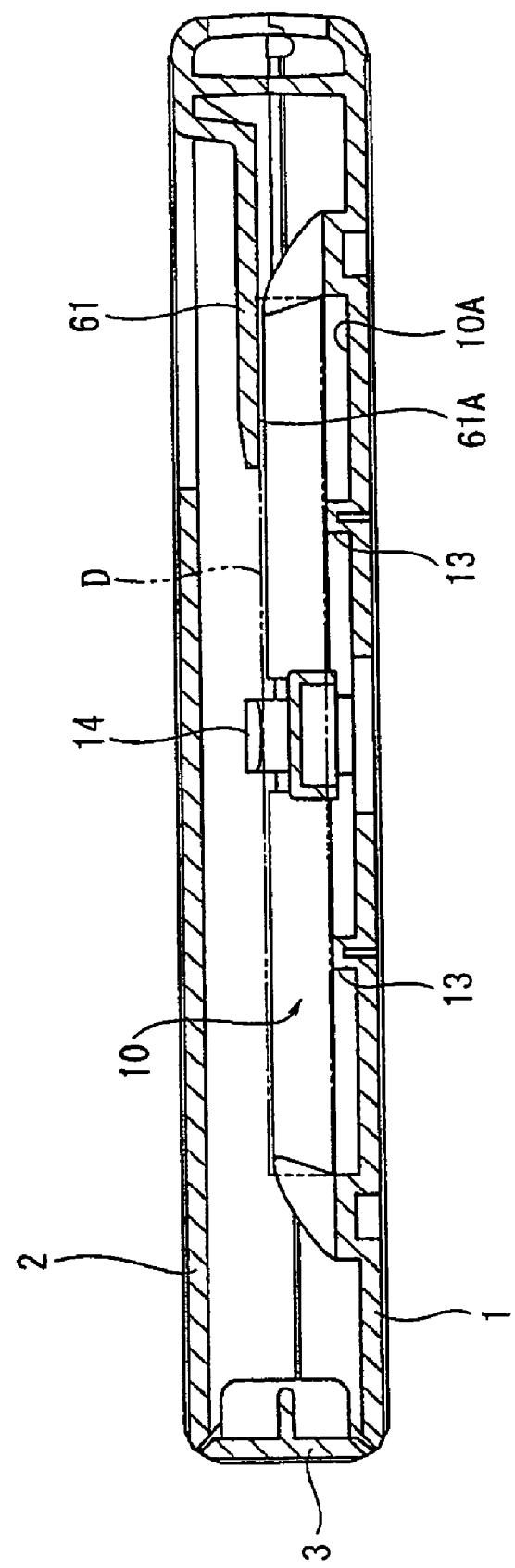
FIG. 14 is a cross sectional view of a closed disk case of the fifth embodiment taken along line XIII-XIII in FIG. 11.

As shown in FIGS. 11 and 13, the keeping section 61 is formed at a position located near the edge of the lid section 2 where the engaging projections 5 are formed on the inner surface of the lid section 2 and between the claws 6 so as to show an L-shaped lateral view. The keeping section 61 is formed in such a way that the distance between the surface thereof that is located vis-à-vis the bottom surface of the lid section 2 and the bottom surface of the lid section 2 is greater than the distance between the surface of each of the claws 6 that is located vis-à-vis the bottom surface of the lid section 2 and the bottom surface of the lid section 2. Like the claws 6, a leaflet, such as a letter of instructions for the operation or the like that is put between the keeping section 61 and the bottom surface of the lid section 2 may be held by the keeping section 61. Additionally, the keeping section 61 partly closes the disk containing section 10 so that the optical disk D contained in the disk containing section 10 defined by the rising wall 31 may not slip down from the disk containing section 10 while the containing section 1 is closed by the lid section 2. More specifically, as the disk containing section 10 is partly covered by the surface 61A of the keeping section 61 that is opposite to the surface of the keeping section 61 located vis-à-vis the bottom surface of the lid section 2, the optical disk D is prevented from inadvertently slipping down from the space of the disk containing section 10 that is defined by the rising wall 31 and partly covered by the surface 61A if the optical disk D is disengaged from the anchoring claws 12A and pops out above the rising wall 31 while the disk case is being transported because the surface 61A partly covers the disk containing section 10 from above. Additionally, as shown in FIG. 14, when the surface 61A abuts the top surface of the optical disk D contained in the disk containing section 10 during an operation of closing the disk case, it presses the optical disk D toward the bottom surface 10A of the disk containing section 10. Note that the keeping section 61 is also formed integrally with the disk case when the disk case is formed by injection molding.

The above-described fifth embodiment provides the advantages as listed below in addition to the advantages of the first and fourth embodiments as described earlier.

As the pair of anchoring claws 12A arranged vis-à-vis the disk containing section 10 engages with the optical disk D and the optical disk D is contained in the disk containing section 10, the meandering sections 12A3 of the anchoring claws 12A are deflected outwardly relative to the optical disk D in a radial direction thereof like so may springs. As a result, the optical disk D is not only urged toward the bottom surface 10A but also subjected to appropriate pressure that is directed inwardly relative to the optical disk D in a radial direction thereof so that the optical disk D is reliably, stably and rigidly held in position.

Additionally, since the surface 61A of the keeping section 61 partly covers the top surface of the optical disk D that is contained in the disk containing section 10 when the disk case is closed, the optical disk D is prevented from slipping down from the disk containing section 10 if the optical disk D is disengaged from the anchoring claws 12A. More specifically, since the surface 61A of the keeping section 61 partly covers the disk containing section 10 from above when the disk case is closed, the optical disk D can be stably held in the space of the disk containing section 10 that is defined by the rising wall 31. Additionally, if the surface 61A abuts the top surface of the optical disk D when the disk case is closed, the optical disk D is pressed toward the bottom surface 10A by the keeping section 61 so that the optical disk D is prevented from moving unnecessarily in the disk containing section 10 and slipping down from the disk containing section 10.

Since the keeping section 61 is formed in such a way that the distance between the surface thereof that is located vis-à-vis the bottom surface of the lid section 2 and the bottom surface of the lid section 2 is greater than the distance between the surface of each of the claws 6 that is located vis-à-vis the bottom surface of the lid section 2 and the bottom surface of the lid section 2, the keeping section 61 prevents the optical disk D and the leaflet from slipping down and holds the leaflet to prevent the leaflet from hindering the claws 6 when the leaflet is placed in position and pinched by the keeping section 61.

Additionally, since the anchoring claws 12A are arranged respectively substantially at the middle of the upper edge of the rising wall 31 and at the middle of the arc-shaped part of the rising wall 31 that defines the disk containing section 10, the anchoring claws 12A are engaged respectively with the upper edge of the optical disk D at the middle thereof and with the arc-shaped part of the optical disk D also at the middle thereof to hold the optical disk D so that the optical disk D is reliably and rigidly held in position. More specifically, since the anchoring claws 12A are arranged at positions located on the center line that divides the optical disk D showing a shield-like profile into axially symmetrical two parts and adapted to engage with respective end parts of the optical disk D, each of the anchoring claws 12A can reliably and rigidly hold the optical disk D at the center line thereof. Thus, the optical disk D is reliably, stably and rigidly held in position.

As pointed out above, the anchoring claws 12A are arranged respectively substantially at the middle of the upper edge of the rising wall 31 and at the middle of the arc-shaped part of the rising wall 31 and, additionally, a pair of supporting projected ridges 13 are arranged in parallel with the line connecting the anchoring claws 12A or vertically in FIG. 11. With such an arrangement, when the optical disk D is taken out from the disk containing section 10, it is turned around the top surface of corresponding one of the supporting/projection ridges 13, which operates as fulcrum for rotating. In other words, the optical disk D may be turned around the belt-shaped section 3 either in the rotary direction of the lid section 2 or in the opposite direction, relative to the containing section 1, using the belt-shaped section 3 as fulcrum. Thus, if compared with an arrangement where the anchoring claws 12A are positioned at the middles of the lateral edges of the disk containing section 10, the optical disk D can be taken out from the closed disk case with a minimal hand motion. In other words, the optical disk D can be taken out from the disk case very easily to thereby construct a user-friendly disk case.

Thus, the present embodiment has, based on the present invention, its own advantages as described below:

Preferably, in the present invention, each of the anchoring claws has: a rising section rising from the bottom surface of the containing section; a claw section adapted to abut the cabinet of the disk; and a meandering section formed between the rising section and the claw section and directed toward the lateral surface of the disk, while meandering from the rising section, and the front end of the meandering section projects beyond the rising wall toward the inside of the containing section.

Thus, according to the present invention, since the anchoring claws meander, they are deflected and become engaged with the disk to apply appropriate pressure to the disk when the disk is contained in the containing section so that the disk can be reliably and stably held in position. Additionally, as the disk is disengaged from the anchoring claws when the disk is taken out from the containing section, the anchoring claws are relieved from the deflection and the disk rises upward so that the disk can be taken out very easily from the containing body.

6th Embodiment

FIGS. 15 through 18 schematically illustrates the sixth embodiment.

The disk case of the above-described fifth embodiment is adapted to contain a single optical disk D in the single case. Accordingly, a single keeping section 61 is provided on the lid section 2.

Figure 15:
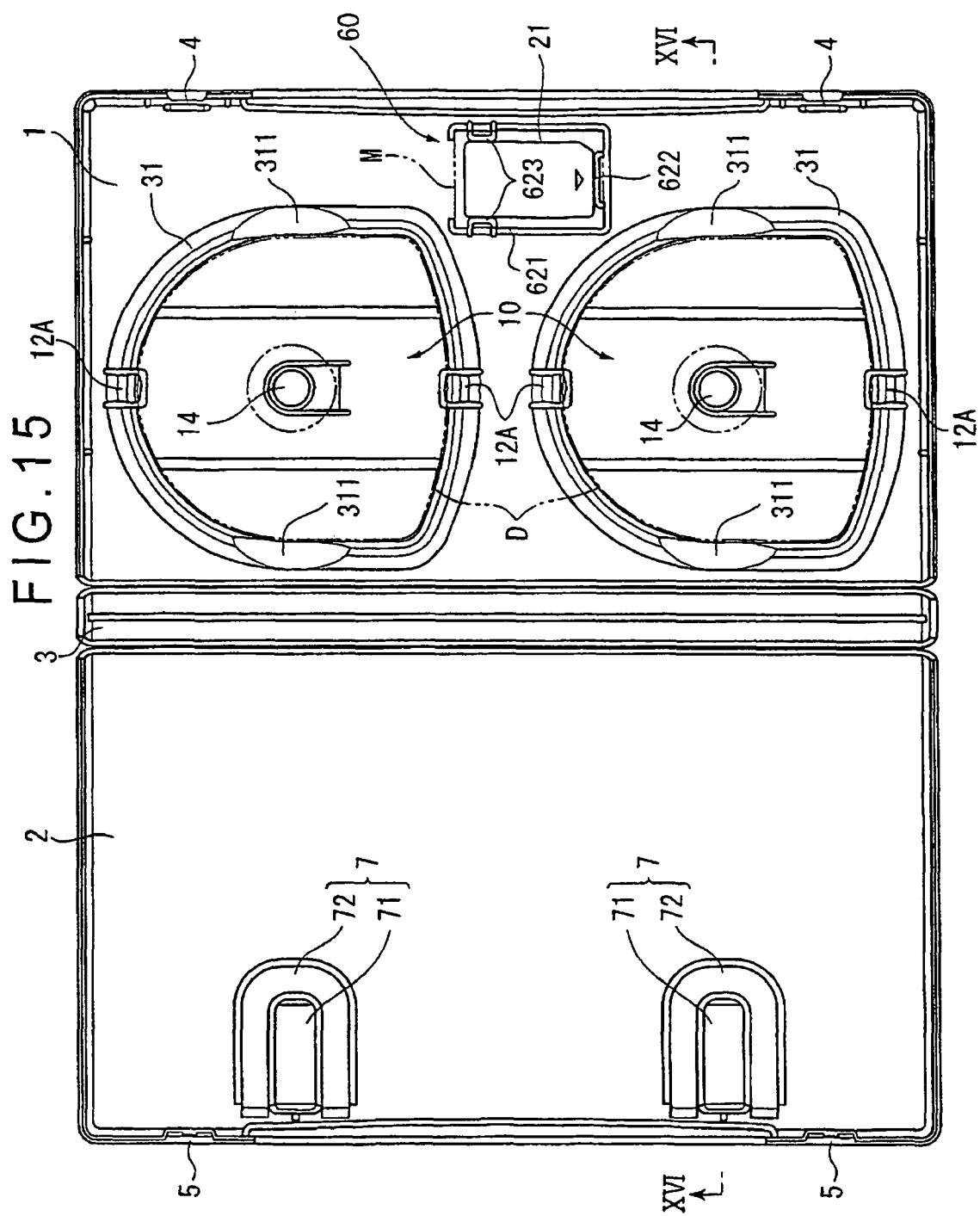
FIG. 15 is a schematic plan view of a sixth embodiment of disk containing body, showing its structure.

On the other hand, as shown in FIG. 15, the disk case of the sixth embodiment has two disk containing sections 10, each of which is identical with the disk containing section 10 of the fifth embodiment. In other words, the disk case of the sixth embodiment contains two optical disks D. The disk case of the sixth embodiment differs from that of the fifth embodiment in that two keeping claws 7 are formed on the lid section 2 of the disk case of this embodiment and each of them operates both as a claw 6 and a keeping section 61, which are described above by referring to the fifth embodiment.

Now, the differences will be described in greater detail below.

Figure 16:
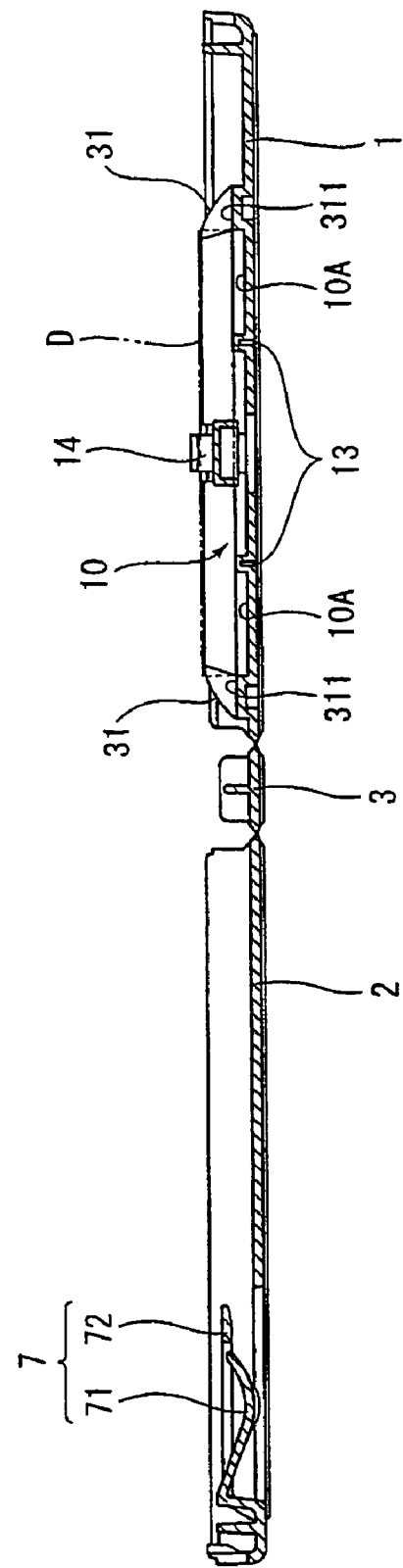
FIG. 16 is a cross sectional view of the sixth embodiment taken along line XVI-XVI in FIG. 15.
Figure 17:
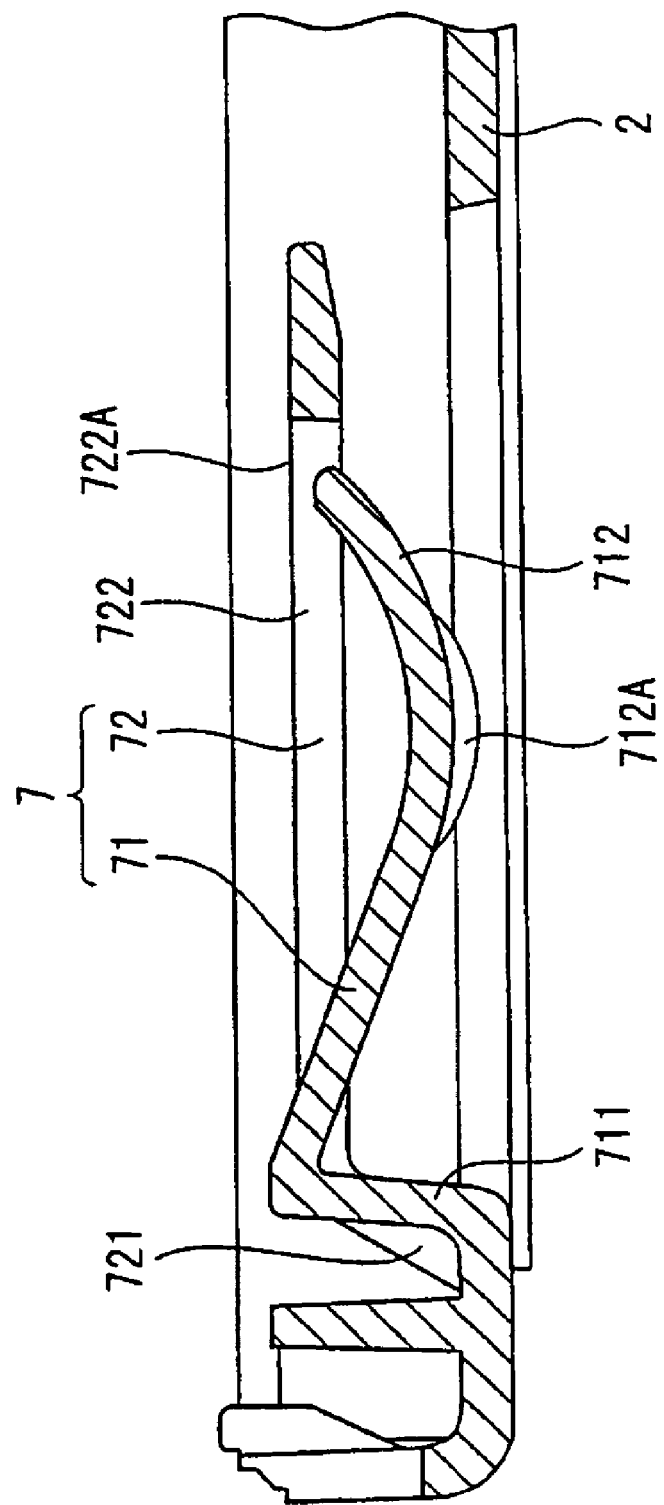
FIG. 17 is an enlarged schematic partial view of the sixth embodiment of FIG. 16.

As shown in FIGS. 16 and 17, a pair of keeping claws 7 is formed on the inner surface of the lid section 2 at positions near the opposite ends of the edge where the engaging projections 5 are formed and located vis-à-vis the respective disk containing sections 10 when the containing section 1 is closed by the lid section 2. As shown in FIGS. 15 through 17, each of the keeping claws 7 has a keeping section 71 rising from the bottom surface of the lid section 2 and showing a substantially L-shaped lateral view and another keeping section 72 also rising from the bottom surface of the lid section 2 and showing a substantially U-shaped plan view so as to horizontally surround the keeping section 71 at the front ends thereof.

As shown in FIG. 17, the keeping section 71 has a rising section 711 that rises from the bottom surface of the lid section 2 and a curved section 712 extending downwardly curvedly from the front end of the rising section 711 toward the belt-shaped section 3 to show a substantially L-shaped lateral view as a whole. The surface of the curved section 712 that is located vis-à-vis the bottom surface of the lid section 2 forms an abutting section 712A adapted to abut a leaflet, such as a letter of instructions for the operation or the like. The curved section 712 is flexible and hence it becomes deflected depending on the thickness of the leaflet so that it can reliably hold the leaflet.

The keeping section 72 has a rising section 721 that rises from the bottom surface of the lid section 2 and a cover section 722 extending horizontally from the front end of the rising section 721 and showing a substantially U-shaped plan view so as to horizontally surround the keeping section 71. The cover section 722 holds the leaflet put between the keeping claws 7 and the bottom surface of the lid section 2 along with the abutting section 712A of the keeping section 71. The surface 722A of the cover section 722 that is opposite to the surface located vis-à-vis the bottom surface of the lid section 2 partly closes the disk containing section 10 from above in order to prevent the optical disk D from slipping down from the disk containing section 10 when the containing section 1 is closed by the lid section 2. The keeping section 72 is formed in such a manner that the distance between the surface of the keeping section 72 located vis-à-vis the bottom surface of the lid section 2 and the bottom surface of the lid section 2 is greater than the distance between the surface of the abutting section 712A of the keeping section 71 located vis-à-vis the bottom surface of the lid section 2 and the bottom surface of the lid section 2. With this arrangement, the keeping section 72 does not constitute any obstacle when a leaflet is pinched by the keeping section 71.

Figure 18:
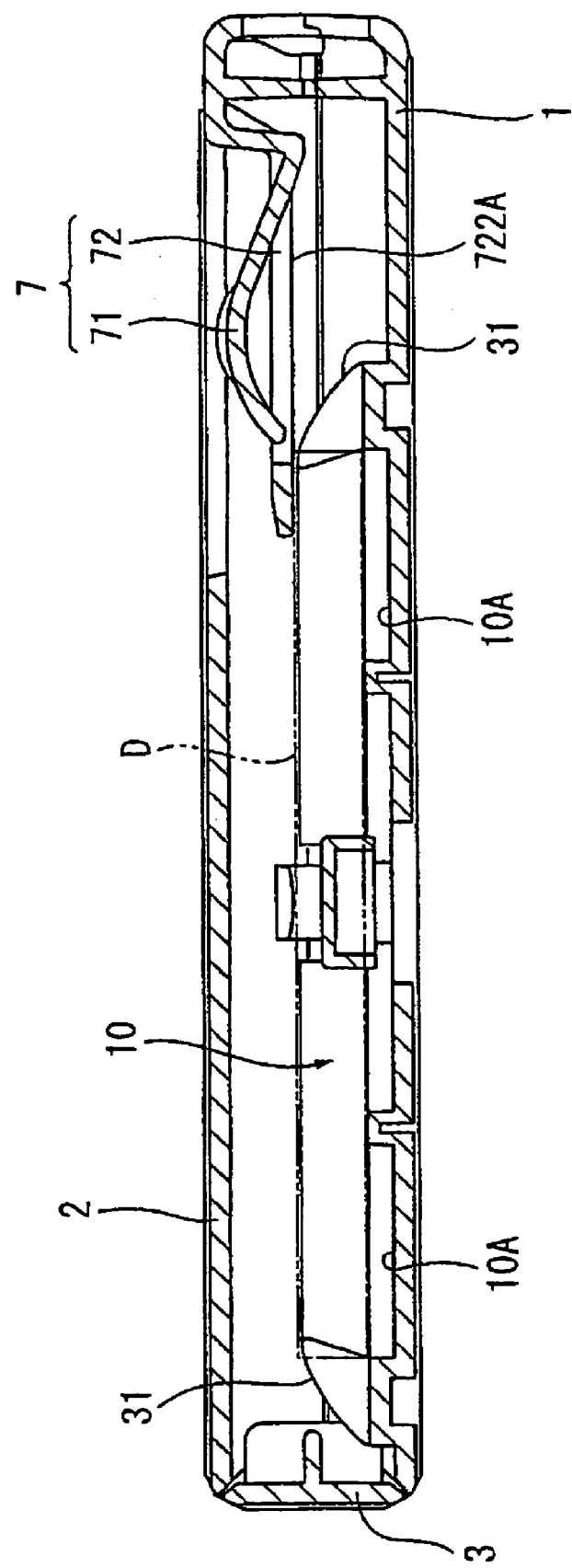
FIG. 18 is a cross sectional view of the closed disk case of the sixth embodiment taken along line XVI-XVI in FIG. 15.

Thus, like the above-described keeping section 61, the surface 722A formed in the cover section 722 of the keeping section 72 partly covers the disk containing section 10 that is defined by the rising wall 31 from above when the disk case is closed so that, if the anchoring claws 12A are disengaged from the optical disk D and the disk D is lifted, the optical disk D is still retained in the space of the disk containing section 10 that is defined by the rising wall 31. Additionally, when the surface 722A of the cover section 722 abuts the top surface of the optical disk D contained in the disk containing section 10 while the disk case is closed as shown in FIG. 18, it presses the optical disk D toward the bottom surface 10A of the disk containing section 10.

The keeping claws 7 constituted by the keeping sections 71, 72 are formed integrally with the disk case when the disk case is formed by injection molding.

The above-described sixth embodiment provides the advantage as described below in addition to the advantages of the above described fifth embodiments.

The lid section 2 is structurally simplified because two keeping claws 7 are arranged at respective positions on the lid section 2 selected to partly close the two disk containing sections 10 formed in the containing section 1 from above and each of them is constituted by a keeping section 71 adapted to hold a leaflet and another keeping section 72 adapted to retain the optical disk D in the space of the corresponding disk containing section 10 when the containing section 1 is closed by the lid section 2. In other words, since it is necessary to provide as many keeping sections 72 as the number of the disk containing sections 10 formed in the containing section 1, the number of components of the lid section 2 will be considerable if the keeping sections 71 and the keeping sections 72 are provided separately. To the contrary, since this embodiment is provided with keeping claws 7, each of which is realized by integrally combining two keeping sections 71, 72, the number of components of the lid section 2 is significantly reduced and hence the lid section 2 is structurally simplified.

7th Embodiment

FIGS. 19 through 25 and FIG. 33 illustrate the seventh embodiment.

Figure 19:
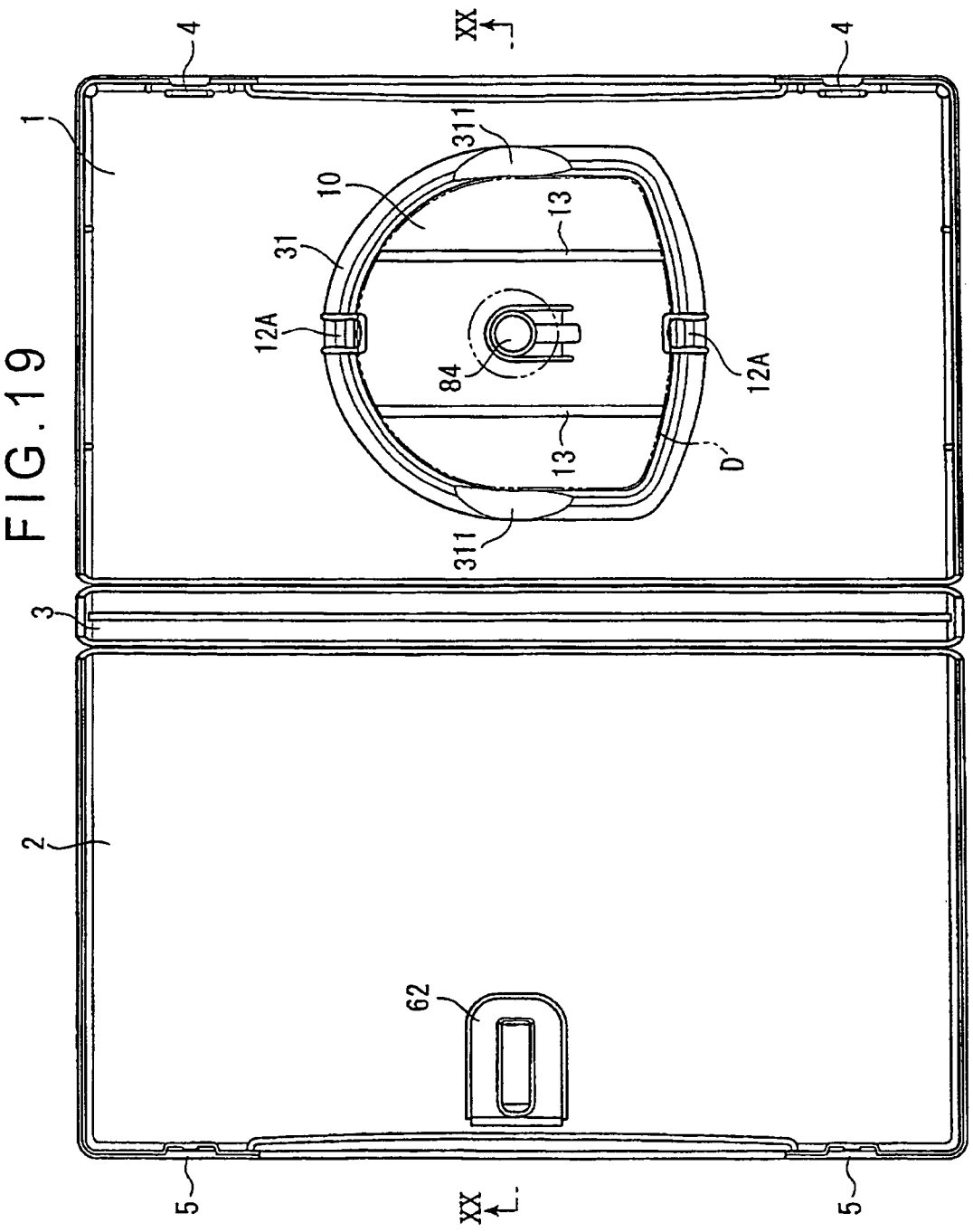
FIG. 19 is a schematic plan view of a seventh embodiment of disk containing body, showing its structure.

FIG. 19 shows a disk case which is the seventh embodiment of disk containing body according to the present invention. The disk case contains an optical disk on which a game program or video information is recorded.

The disk case comprises a containing section 1 for containing an optical disk D and a lid section 2 for closing the aperture of the containing section 1 for receiving the disk. The containing section 1 and the lid section 2 are linked to each other by a belt-shaped section 3 that is located substantially at the middle. The boundary of the belt-shaped section 3 and the containing section 1 and the boundary of the belt-shaped section 3 and the lid section 2 show respective hinge structures so that the lid section 2 can be turned toward the containing section 1 around the belt-shaped section 3, which operates as fulcrum for rotating the lid section 2, to fully close the containing section 1.

The edge wall of the containing section 1 located opposite to the edge wall thereof that is linked to the belt-shaped section 3 is provided at the inside thereof with two engaging grooves 4. On the other hand, the edge wall of the lid section 2 located opposite to the edge wall thereof that is linked to the belt-shaped section 3 is provided with engaging projections 5. Thus, when closing the containing section 1 by the lid section 2, the engaging projections 5 are pushed into the respective engaging grooves 4 for mutual engagement in order to firmly close the disk case.

The lid section 2 is provided with a keeping section 62 on the inner surface thereof at an area near an end part along the edge wall where the engaging projections 5 are formed. The letter of instructions for the operation of the game program, the leaflet of the movie or the like may be held by the keeping section 62.

The containing section 1 contains an optical disk D and has a disk containing section 10 for receiving the optical disk D.

Although not shown in the drawings, the optical disk D includes a cabinet made of synthetic resin and showing a shield-like plan view that contains a disk main body in the inside, which has a circular contour by definition. The disk main body that is contained in the inside is an optically readable type disk having a circular contour and can record video information such as a game program or a moving picture. Although not shown in the drawings, a synthetic-resin-made cabinet is provided at a lateral edge thereof with an aperture so that, when the optical disk D is mounted in an electronic appliance, the information recorded on the disk main body can be optically read through the aperture.

As shown in FIG. 19, the disk containing section 10 has in the inside thereof a containing space whose profile matches the profile of the cabinet of the optical disk D and a rising wall 31 to surround the outer peripheral edges of the containing space having a shield-like profile. The rising wall 31 surrounds the whole optical disk D.

The rising wall 31 can be formed by raising part of the bottom surface of the synthetic-resin-made containing section 1. In other words, it can be formed integrally with the disk case when the disk case is formed by injection molding.

The rising wall 31 is provided substantially at the middles thereof with a pair of anchoring claws 12A arranged vis-à-vis and projecting inwardly respectively from the corresponding lateral wall surfaces with the contained optical disk D interposed between them. The line that connects the paired anchoring claws 12A runs through the rotary center of the disk main body of the contained disk D.

Figure 33:
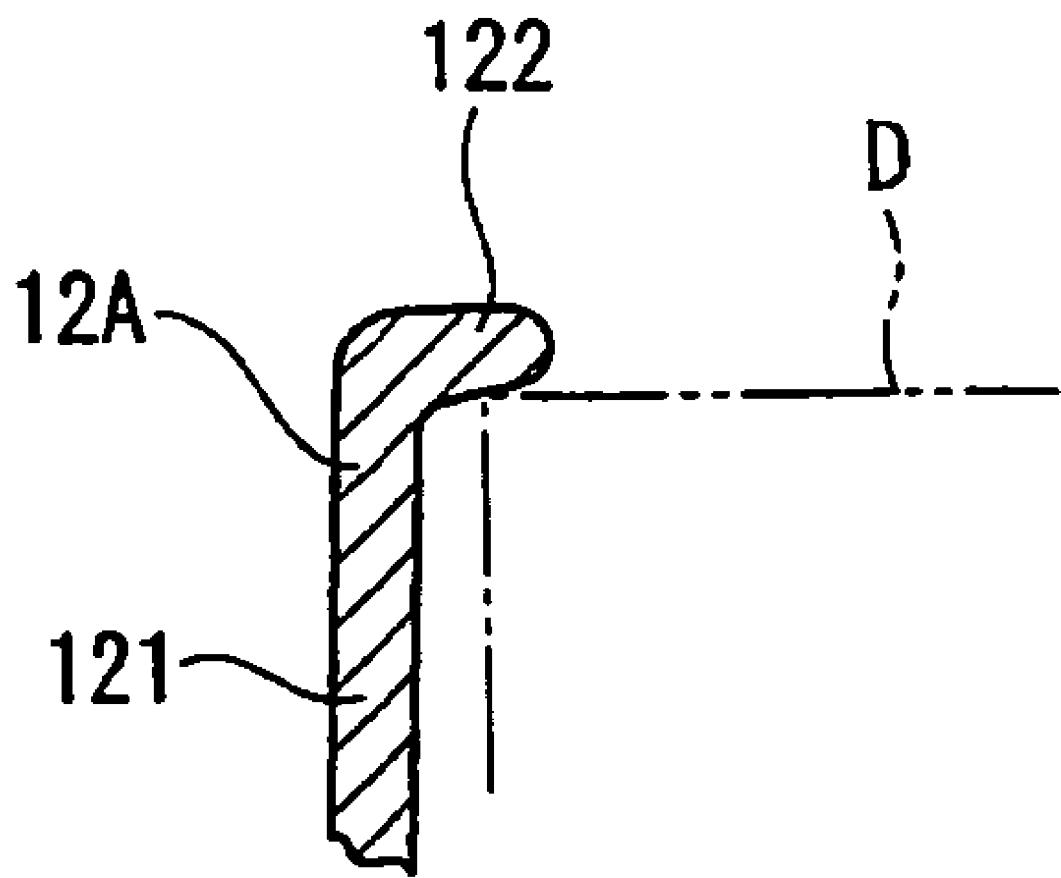
FIG. 33 is a cross sectional view of a principal part of the seventh embodiment.

The anchoring claws 12A are components for pressing the contained optical disk D from the aperture side toward the bottom surface side of the containing section 1 so as to rigidly hold it in position. As shown in FIG. 33, each of the anchoring claws 12A has a base section 121 rising from a bottom surface of the disk containing section 10 and a claw section 122 formed by bending the base section 121 at the front end thereof. As shown in FIG. 33, the abutting surface of the claw section 122 that abuts the optical disk D is inclined downwardly from the front end of the claw section 122 toward the base section 121 so as to approach the bottom surface of the containing section 1.

As shown in FIG. 19, in the disk containing section 10, a pair of supporting projected ridges 13 are formed integrally with the bottom surface of the containing section 1 as supporting projections.

The supporting projected ridges 13 abut the lower surface of the cabinet of the optical disk D contained in the disk containing section 10 in order to support the optical disk D in a state suspended above and away from the bottom surface of the disk containing section 10.

As described above, the anchoring claws 12A and the supporting projected ridges 13 of the present embodiment are the same as those of the fifth embodiment.

Like the anchoring claws 12 described above, the anchoring claws 12A of this embodiment are adapted to press the contained optical disk D from the aperture side of the containing section 1 toward the bottom surface side thereof and rigidly hold it in position. As shown in FIG. 19, the anchoring claws 12A are arranged respectively substantially at the middle of the upper edge of the disk containing section 10 and at the middle of the arc-shaped part of the section 10, which the section 10 showing a shield-like profile. Thus, the anchoring claws 12A are arranged oppositely relative to each other. More specifically, the anchoring claws 12A are arranged at positions located on the center line that divides the optical disk D showing a shield-like profile into axially symmetrical two parts and adapted to engage with respective end parts of the optical disk D. Additionally, the supporting projected ridges 13 are arranged in parallel with the line connecting the anchoring claws 12A. Still additionally, recesses 311 are formed respectively at the intersections of the line that rectangularly intersects the line connecting the anchoring claws 12A at the center of the disk containing section 10 and the rising wall 31.

The top end of the rising wall 31 is made to show such a height that, when the optical disk D is mounted, the top surface of the optical disk D is located above the top end. The rising wall 31 is provided at opposite ends thereof, the line connecting the opposite ends being perpendicular relative to the line connecting the paired anchoring claws 12A, with respective recesses 311 that are lower than the top end of the rising wall 31 so as to expose the lateral surface of the optical disk D.

When taking out the optical disk D from the disk containing section 10, the optical disk D is pressed downward at an end part thereof located at the position corresponding to one of the recesses 311 of the rising wall 31 to turn around one of the supporting projected ridges 13, which operates as fulcrum, as in the case of the first embodiment.

Since the rising wall 31 is formed to substantially entirely surround the optical disk D along the outer periphery thereof, the disk containing section 10 is reinforced by the rising wall 31 to improve the overall strength of the containing section 1 so that the disk case would not be deformed if external force is applied to the disk case after mounting the optical disk D and hence the optical disk D mounted in the inside is protected reliably.

Additionally, since recesses 311 are formed at part of the rising wall 31, the user can clearly see where he or she has to press when taking out the optical disk D that is mounted in the inside to a great convenience on the part of the user.

Thus, the differences between the disk case of the seventh embodiment and that of the fifth embodiment (FIGS. 11 through 14) are listed below.

(7-1) The memory containing section 60 is omitted and the disk containing section 10 is arranged at the center of the containing section 1.

(7-2) The top surface of the rising wall 31 surrounding the outer periphery of the disk containing section 10 is held lower than the top surface of the optical disk D contained in the disk containing section 10.

(7-3) The movement restricting section 84 arranged at the center of the disk containing section 10 differs from that of the fifth embodiment.

(7-4) The keeping section 62 arranged on the lid section 2 also differs from that of the fifth embodiment.

(7-1) As shown in FIG. 19, the disk containing section 10 of this embodiment is arranged substantially at the center of the containing section 1 having a rectangular profile in terms of both the long sides and the short sides thereof.

Figure 20:
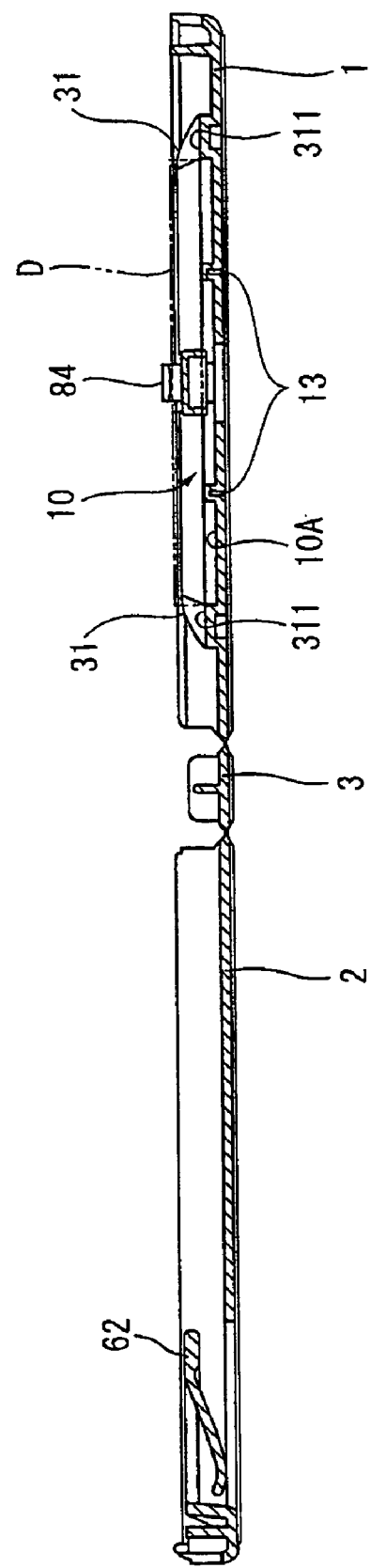
FIG. 20 is a cross sectional view of the seventh embodiment taken along line XX-XX in FIG. 19.
Figure 21:
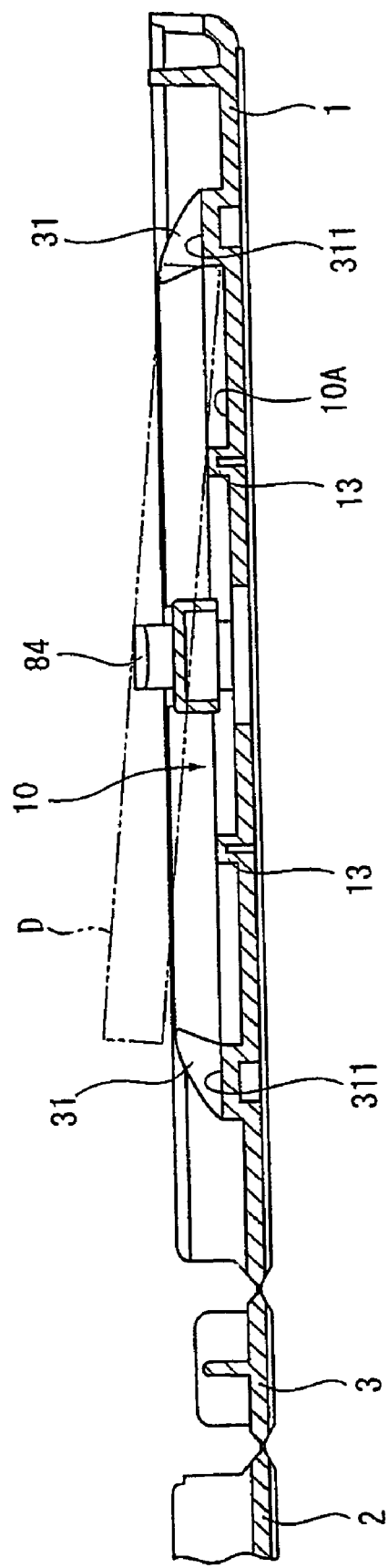
FIG. 21 is a cross sectional view of the seventh embodiment, illustrating how the disk case is taken out.

(7-2) As shown in FIG. 20, the top surface of the rising wall 31 surrounding the outer periphery of the disk containing section 10 is held lower than the top surface of the optical disk D contained in the disk containing section 10. With this arrangement, when the outer peripheral edge of the optical disk D contained in the disk containing section 10 is pressed toward the bottom surface 10A of the disk containing section 10 typically by means of a finger tip, the pressure exerted by the finger tip is firstly applied to the optical disk D so that the optical disk D is inclined around the corresponding one of the supporting projected ridges 13 that operates as fulcrum (see FIG. 21). Then, as a result, the end part of the optical disk D opposite to the depressed part of the peripheral edge is lifted and moved away from the bottom surface 10A of the disk containing section 10 to incline the optical disk D. Thus, the user can easily hold the optical disk D and take it out from the disk containing section 10.

As the optical disk D is depressed further, the finger tip pressing the optical disk D eventually hits the top surface of the rising wall 31. Then, the finger tip cannot depress the optical disk D any further. Since the optical disk D is resiliently pinched by a pair of anchoring claws 12A, 12A at radially opposite ends thereof and hence the optical disk D is held in the disk containing body by the pinching force of the paired anchoring claws 12A, 12A, the optical disk D is prevented from slipping down from the disk containing body when the optical disk D is taken out from the disk containing section 10 while the disk containing body is held in an inclined state.

Figure 22:
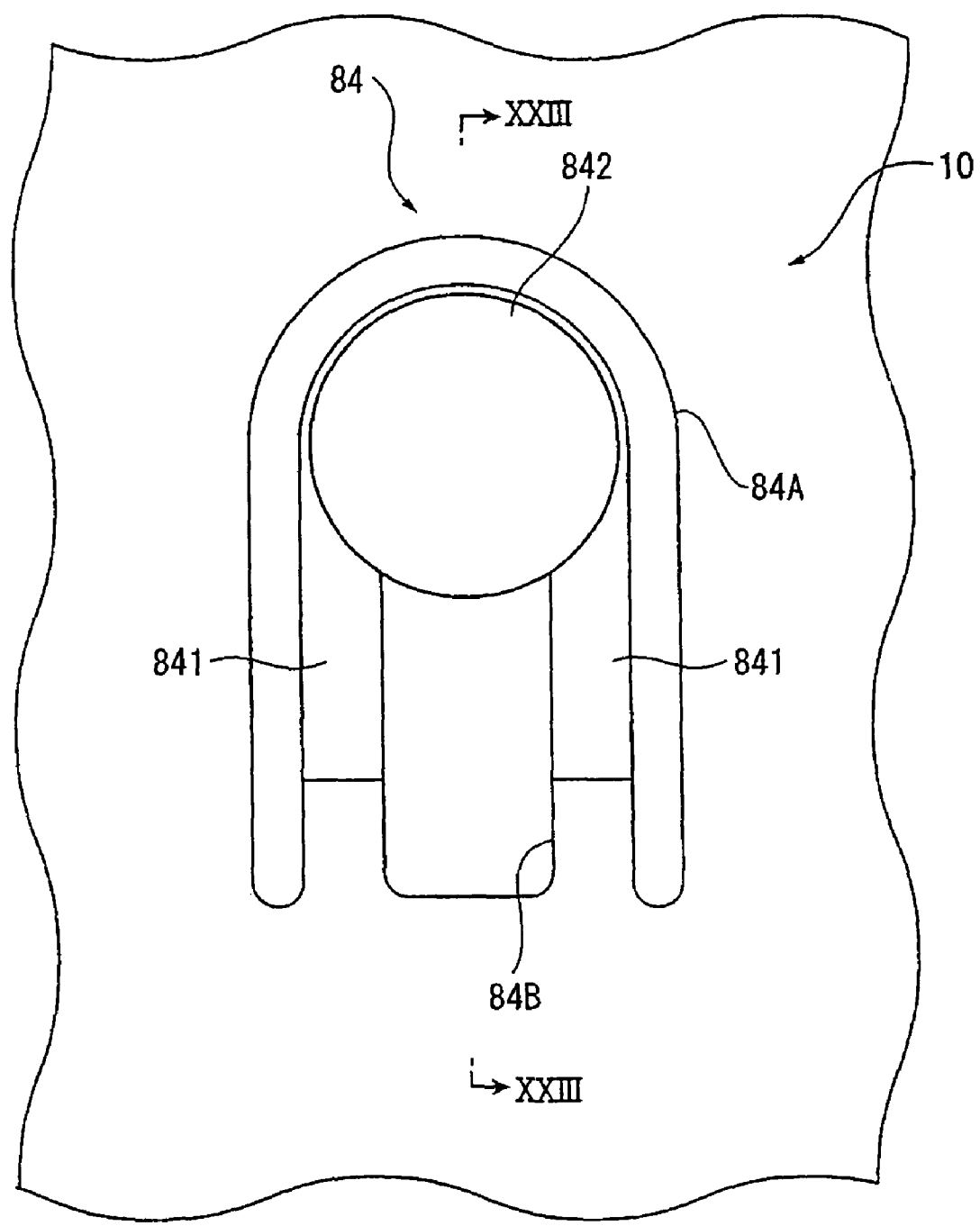
FIG. 22 is an enlarged schematic view of a movement restricting section of the seventh embodiment.
Figure 24:
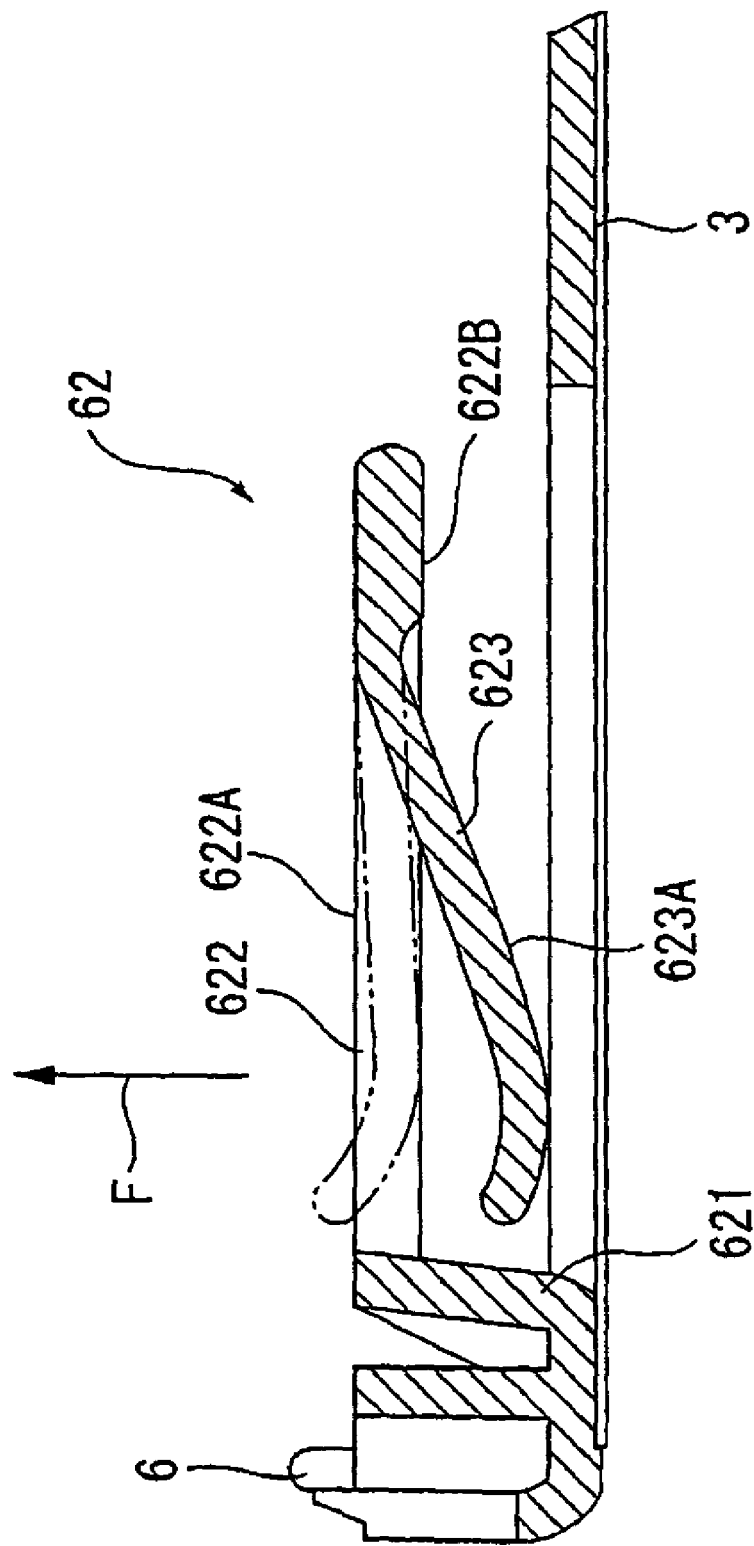
FIG. 24 is an enlarged schematic view of a keeping section of the seventh embodiment.

(7-3) As shown in FIGS. 22 and 24, the movement restricting section 84 arranged at the center of the disk containing section 10 is formed by cleaving a substantially U-shaped part 84A of the bottom surface 10A and making the inward part thereof project away from the bottom surface 10A. The movement restricting section 84 has an arm section 841 upwardly rising aslant from the bottom surface 10A and an abutting section 842 substantially horizontally extending from the front end of the arm section 841.

Figure 23:
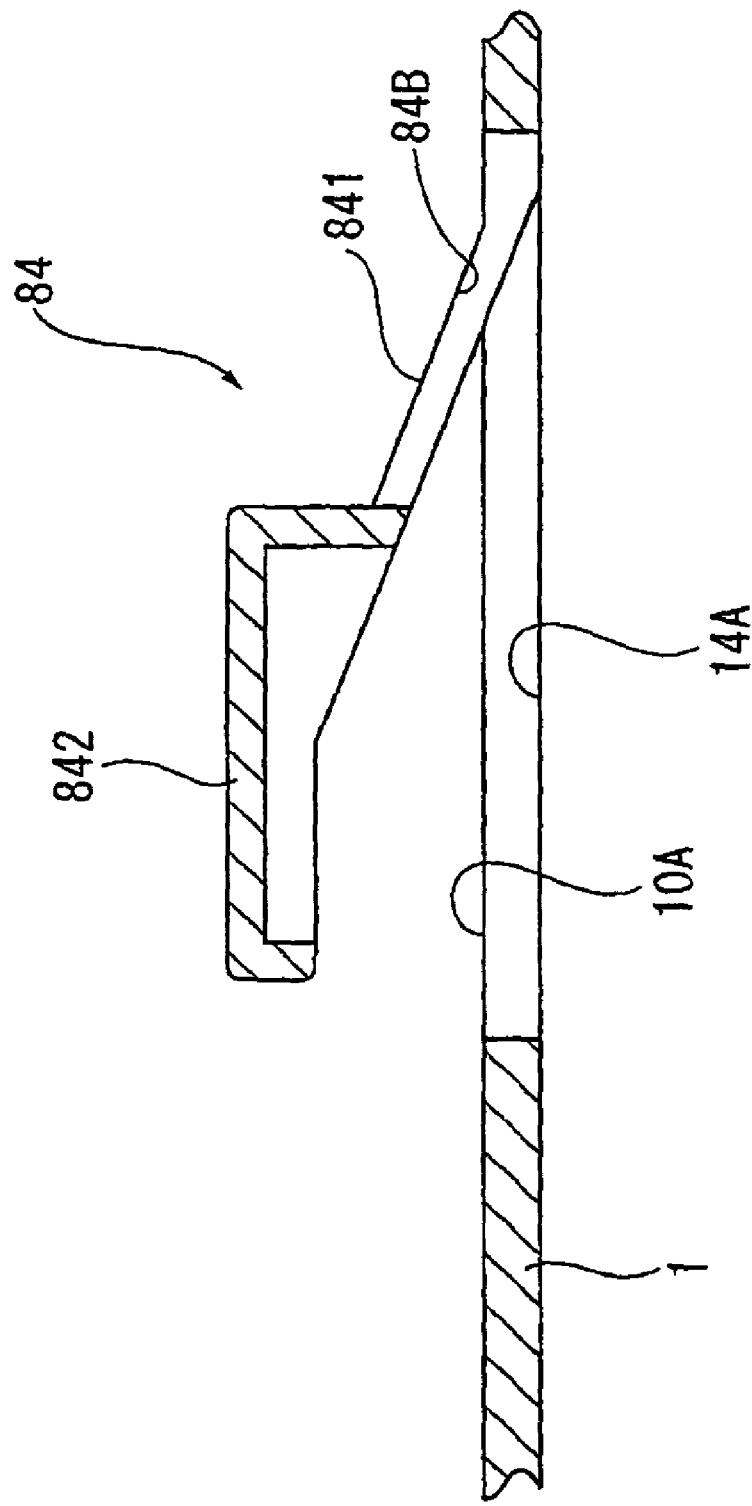
FIG. 23 is a cross sectional view of the seventh embodiment taken along line XXIII-XXIII in FIG. 22.

As shown in FIG. 23, the arm section 841 is made to show a thickness smaller than that of the bottom surface 10A. It is adapted to be resiliently deflected when force that is directed to the bottom surface 10A of the disk containing section 10 is applied to the abutting section 842. The arm section 841 has a cleaved part 84B at the center thereof. Since the lateral dimension of the arm section 841 is defined by the lateral dimension, or the horizontal dimension in FIG. 22, of the cleaved part 84B, the resilient force of the arm section 841 is defined as a function of the lateral dimension of the cleaved part 84B. Therefore, it is possible to regulate the urging force of the abutting section 842 for driving the optical disk D to move away from the bottom surface 10A without changing the distance between the bottom surface 10A and the abutting section 842, or the height of the abutting section 842, by appropriately selecting the size of the cleaved part 84B and hence the lateral dimension of the arm section 841.

When the optical disk D is mounted in the disk containing section 10, the abutting section 842 abuts the center hole part of the disk main body that is contained in the inside of the cabinet. As the abutting section 842 abuts the center hole part of the disk main body, the arm section 841 is deflected toward the bottom surface 10A and the disk main body is urged upwardly by the resilient force of the deflected arm section 841 to consequently abut the inner surface of the cabinet of the optical disk D and restrict any movement of the disk main body.

(7-4) The keeping section 62 formed on the lid section 2 is adapted to pinch a leaflet and, when the disk receiving aperture of the containing section 1 is closed by the lid section 2, it partly covers the disk containing section 10 to prevent the optical disk D from slipping down from the disk containing section 10.

As shown in FIG. 24, the keeping section 62 has a rising section 621 that rises from the bottom surface of the lid section 2 and an extending section 622 extending from the front end of the rising section 621 toward the belt-shaped section 3 substantially in parallel with the bottom surface of the lid section 2 to show a substantially L-shaped lateral view. The extending section 622 is provided substantially at the center thereof with a substantially U-shaped cleaved part that starts from the end thereof located close to the belt-shaped section 3 to form a pinching section 623 that extends away from the belt-shaped section 3 and toward the bottom surface of the lid section 2 then becomes curved mildly away from the bottom surface at the top end thereof. The keeping section 62 is integrally formed with the lid section 2.

Figure 25:
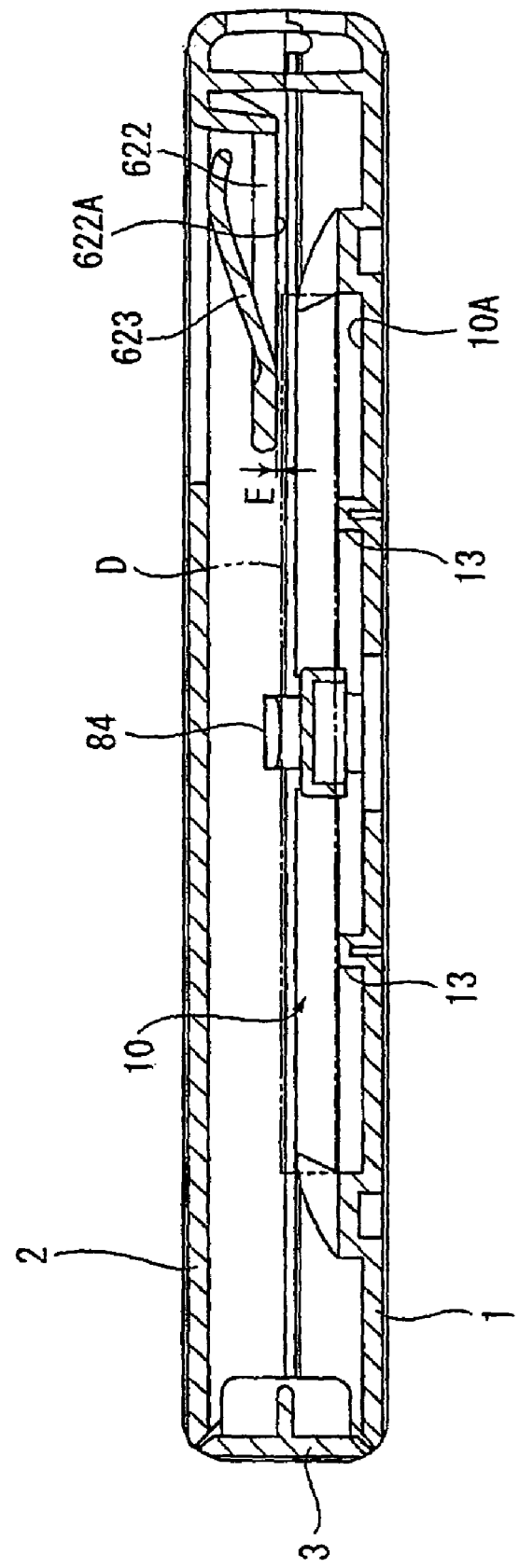
FIG. 25 is a cross sectional view of a closed disk case of the seventh embodiment.

The extending section 622 is flexible and extending in such a way that, when the disk receiving apertures of the containing section 1 is closed by the lid section 2, it partly covers the disk containing section 10 from above as seen from FIG. 25.

As shown in FIG. 25, a clearance E is produced between the surface 622A of the extending section 622 that is located vis-à-vis the bottom surface 10A and the top surface of the optical disk D when the disk case is closed.

Due to the provision of the extending section 622, when the disk case is closed and if the engaging claws 12A and the optical disk D are disengaged from each other to allow the optical disk D to lift up, the surface 622A of the extending section 622 abuts the top surface of the optical disk D to retain the optical disk D in the region of the disk containing section 10. Additionally, since a clearance is produced between the surface 622A of the extending section 622 and the top surface of the optical disk D, the extending section 622 is prevented from damaging the top surface of the optical disk D. Still additionally, if the optical disk D has a large thickness and the surface 622A of the extending section 622 abuts the top surface of the optical disk D, the extending section 622 is deflected upward in FIG. 25 to urge the optical disk D toward the bottom surface 10A of the disk containing section 10. As a result, the optical disk D is formed to stay in the disk containing section 10 and hence the optical disk D is stably contained in the disk containing section 10.

The pinching section 623 holds the leaflet pinched between bottom surface of the lid section 2 and the surface 623A of the pinching section 623 that is located vis-à-vis the bottom surface. As shown in FIG. 19, it is a part formed substantially at the center of the extending section 622 to show a substantially U-shaped plan view. As shown in FIG. 24, the pinching section 623 extends from its end located close to the belt-shaped section 3 (front end of the extending section 622) away from the belt-shaped section 3 and mildly toward the bottom surface of the lid section 2. Then, it is curved upwardly away from the bottom surface from the position where the surface of the pinching section 623 is located vis-à-vis the bottom surface of the lid section 2 becomes flush with the bottom surface.

The pinching section 623 is flexible and adapted to turn in the direction of arrow F around its end located close to the belt-shaped section 3 depending on the thickness of the leaflet pinched by it so as to exert urging force on the leaflet in the direction opposite to the arrow F. As a result, the leaflet is reliably pinched between the bottom surface of the lid section 2 and the surface 623A of the pinching section 623.

The pinching section 623 can pinch and hold a leaflet having a thickness up to the dimension of the gap between the bottom surface of the lid section 2 and the surface 622B of the extending section 622 located vis-à-vis the bottom surface. If the leaflet has such a thickness, the surface 623A of the pinching section 623 becomes substantially flush with the surface 622B of the extending section 622 that is located vis-à-vis the bottom surface of the lid section 2 as indicated by the dotted chain line in FIG. 24. Then, the front end part of the pinching section 623 slightly projects upward from the surface 622A of the extending section 622.

When the disk case is closed as shown in FIG. 25 and a leaflet having the largest thickness that the pinching section 623 can pinch and hold is actually being pinched and held by the pinching section 623, the upwardly projecting front end part of the pinching section 623 would not be blocked by any member in the disk case. Differently stated, if the front end part of the pinching section 623 projects upward from the level of the surface 622A of the extending section 622, it would not abut any other member of the disk case. Therefore, when a keeping section 62 having such a pinching section 623 is arranged in the disk case, the disk case can pinch and hold a leaflet and the thickness of the leaflet is not limited by any other members in the disk case. Thus, the internal space of the disk case can be maximally exploited.

Thus, the present embodiment has, based on the present invention, its own advantages as described below:

Preferably, the supporting projections are so arranged that, when the disk is pressed toward the bottom surface of the containing section at an end thereof, the disk is inclined so as to make the opposite end of the disk project from the bottom surface of the containing section.

Thus, according to the present invention, since the disk is rigidly held in the containing section in a state of being pressed by the rising wall and the anchoring claws, it would not move when it is being transported and the optical disk can be contained in the disk containing body so as not to move in the disk containing body without requiring the use of separately prepared packaging members. When, on the other hand, the disk is to be taken out from the containing section, it is sufficient for the user to push the disk from above at an end thereof. Then, the other end of the disk rises due to the lever effect and the anchoring claws are disengaged from the disk so that the user can easily take out the disk from the containing body.

In the present invention, it is preferable that the pair of anchoring claws projects from respective positions adapted to press and rigidly hold the contained disk at radially opposite ends thereof and is arranged at a height suitable for resiliently pinching the disk at the edge thereof at radially opposite positions when the disk is pressed toward the bottom surface of the containing section at an end thereof and inclined so as to make the opposite end of the disk project from the bottom surface of the containing section.

Thus, according to the present invention, as the user presses the disk toward the bottom surface of the containing section at an end thereof, the disk is inclined so as to make the opposite end of the disk project from the bottom surface of the containing section. At this time, since the disk is pinched by the pair of anchoring claws at the edge thereof at radially opposite positions and hence held in the disk containing body by the pinching force of the pair of anchoring claws, the disk is prevented from falling from the disk containing body when it is taken out from the containing section while the disk containing body is held in an inclined state, for instance.

Preferably, in the present invention, the pair of anchoring claws projects from positions adapted to press and rigidly hold the contained disk at radially opposite ends thereof and each of the plurality of projections is a ridge extending along the line connecting the pair of anchoring claws.

Thus, according to the present invention, since ridges are extending along the line connecting the anchoring claws, it is possible to apply force for disengaging the anchoring claws by depressing an outer peripheral part of the disk other than the parts thereof located on the ridges so that the disk can be taken out from the containing body further easily.

Preferably, in the present invention, when the pair of anchoring claws projects from respective positions adapted to press and rigidly hold the disk main body of the contained disk at radial ends thereof, the ridges are formed at positions substantially symmetrical relative to the line connecting the pair of anchoring claws.

Thus, according to the present invention, since the ridges are formed at positions substantially symmetrical relative to the line connecting the pair of anchoring claws, the force trying to press the mounted disk by the anchoring claws is supported by the two ridges in an evenly distributed manner so that the disk can be contained in the containing section very reliably.

Preferably, in the present invention, the surface of each of the anchoring claws adapted to abut the disk is a slope that comes closer to the bottom surface of the containing section as it rises higher toward the outside of the disk.

Thus, according to the present invention, since the abutting surfaces are inclined, the anchoring claws can reliably abut the top surface of the disk cabinet if the thickness of the cabinet involves a dimensional error so that the disk can be reliably and rigidly held in the containing section.

Preferably, in the present invention, a movement restricting section is arranged on the bottom surface of the containing section projecting away from the bottom surface at a position corresponding to the rotary center of the disk main body in such a way that, when the disk is engaged with and rigidly held by the pair of anchoring claws, it urges the disk main body away from the bottom surface to restrict movement of the disk main body within the cabinet.

Thus, according to the present invention, as the disk is contained in the containing section, the disk main body is held immovable in the cabinet by the movement restricting section so that the disk main body would not move to give rise to noises and the like in the inside if the disk containing body is shaken with the disk contained therein.

Preferably, in the present invention, the lid section is provided with a keeping section for preventing the disk contained in the containing section from slipping down in a state where the lid section closes the disk receiving aperture of the containing section and the keeping section includes: a rising section rising from the bottom surface, of the lid section; an extending section extending from the front end of the rising section substantially in parallel with the bottom surface of the lid section; and a pinching section extending from the front end of the extending section toward the base end of the extending section and also toward the bottom surface of the lid section.

Thus, according to the present invention, if the disk is disengaged from the anchoring claws and rises upward in a state where the lid section closes the disk receiving aperture of the containing section, the extending section of the keeping section abut the disk to prevent the disk from slipping down. Additionally, a leaflet or the like may be pinched and held between the pinching section and the bottom surface of the lid section.

Thus, the information providing body according to the present invention provides the advantages substantially as described above for the disk containing body according to the present invention. More specifically, the disk contained in the containing section of the disk containing body is pressed and rigidly held by the anchoring claws in a state where the disk is supported by the supporting projection having a dimension smaller than the dimension of the outer periphery of the disk so that the disk can be raised with ease at an end thereof from any position in the containing section except the spots where the anchoring claws are arranged. Then, it is possible to take out the disk very easily.

With such an information providing body, a disk and a disk containing body containing the disk and allowing the disk to be taken out with ease can be packed into a single package and offered to the user.

8th Embodiment

Figure 26:
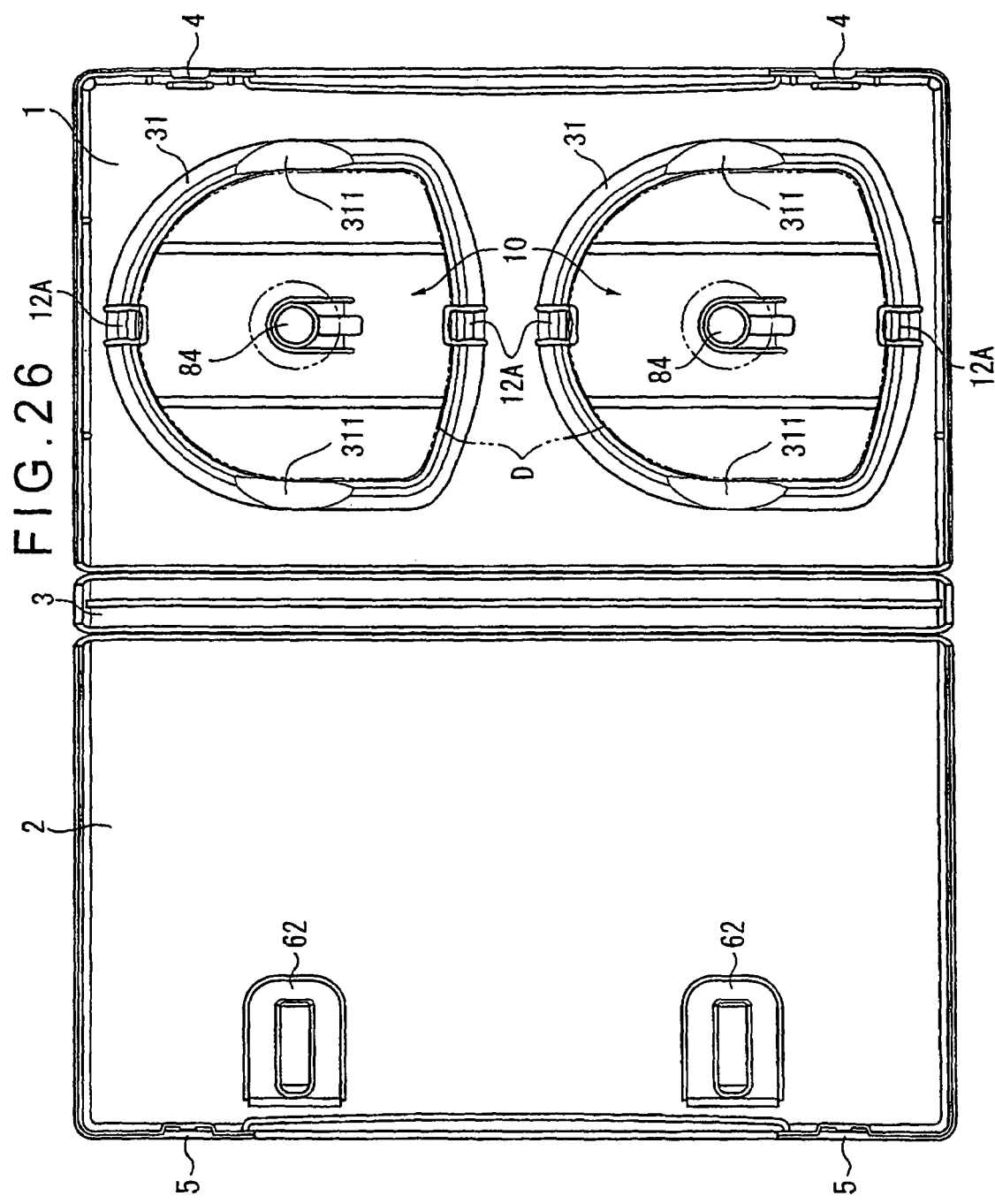
FIG. 26 is a schematic plan view of an eighth embodiment of disk containing body, showing its structure.

FIG. 26 illustrates the eighth embodiment.

The disk case of the eighth embodiment differs from the above described disk case (FIGS. 19 through 25) of the seventh embodiment in that two disk containing sections 10 are arranged in the containing section 1 and correspondingly two keeping sections 62 are arranged on the lid section 2. Otherwise (other than the number of the disk containing sections 10 and that of the keeping sections 62), the disk case of the eighth embodiment is identical with that of the seventh embodiment.

Feasible Modifications to 1st through 8th Embodiments

While each of the above-described first through eighth embodiments includes a pair or two pairs of supporting projected ridges 13 that extend in the direction of the line connecting a pair of anchoring claws 12, the present invention is by no means limited thereto. For example, four spot-like supporting projections may alternatively be arranged around the outer periphery of the optical disk D or each of the optical disks D contained in the disk case. Still alternatively, a plurality of spot-like projections may be arranged along lines running in parallel with the line A connecting a pair of anchoring claws 12 as shown in FIG. 1.

9th Embodiment

FIGS. 27 through 30 illustrates the ninth embodiment.

Figure 27:
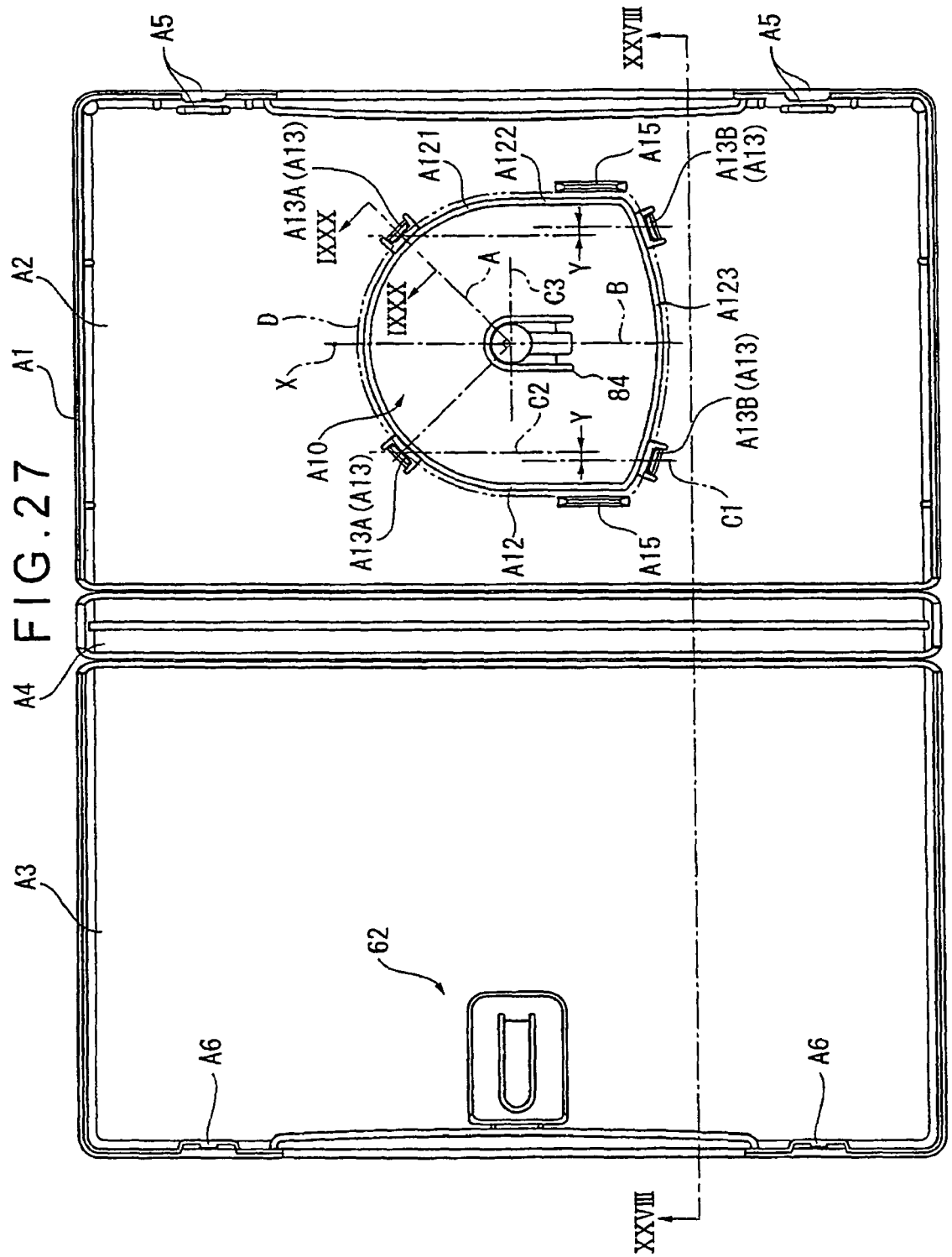
FIG. 27 is a schematic plan view of a ninth embodiment of disk containing body, showing its structure.

FIG. 27 shows the disk case A1 of the ninth embodiment.

The disk case A1 is a disk containing body adapted to contain an optical disk on which a game program, video information or audio information is recorded. Such a disk case A1 is combined with the optical disk D contained therein to form an information providing body. Then, the disk case A1 and the optical disk D are packed into a single package to form an information providing body and may be commercially distributed.

The disk case A1 comprises a containing section A2 showing a recessed cross section and adapted to contain an optical disk D and a lid section A3 also showing a recessed cross section and adapted to close the disk receiving aperture of the containing section A2, the containing section A2 and the lid section A3 being linked to each other by a belt-shaped section A4 that is located substantially at the middle. The boundary of the belt-shaped section A4 and the containing section A2 and the boundary of the belt-shaped section A4 and the lid section A3 show respective hinge structures so that the lid section A3 can be turned toward the containing section A2 around the belt-shaped section A4, which operates as fulcrum for rotating the lid section A3, to fully close the containing section A2.

The edge wall of the containing section A2 located opposite to the edge wall thereof that is linked to the belt-shaped section A4 is provided at the inside thereof with a pair of pinching pieces A5, which are arranged respectively at upper and lower positions in FIG. 27 and formed integrally with the containing section A2. On the other hand, the edge wall of the lid section A3 located opposite to the edge wall thereof that is linked to the belt-shaped section A4 is provided with a pair of engaging projections A6 with their front ends hooked in the direction away from the belt-shaped section A4. The engaging projections A6 are arranged respectively at upper and lower positions in FIG. 27. Thus, when closing the containing section A2 by the lid section A3, the engaging projections A6 are pushed into the respective pinching pieces A5 until the engaging projections A6 are pinched by the respective pinching pieces A5 to firmly close the disk case A1.

The lid section A3 is provided on the bottom surface thereof with the keeping section 62 at a position substantially at the middle of the edge of the lid section A3 where the engaging projections A6 are formed. The keeping section 62 is integrally formed with the lid section A3 so that the letter of instructions for the operation of the game program, the leaflet of the movie or the like may be held by the keeping section 62. Since the keeping section 62 is structurally identical with the keeping section 62 of the seventh embodiment, it will not be described here any further.

A disk containing section A10 is formed in the containing section A2 to contain an optical disk D therein.

Although not illustrated in detail in the figure, the optical disk D includes a cabinet that is made of synthetic resin and an optical disk main body that shows a substantially circular contour and is contained in the cabinet.

Of these, the optical disk main body is an optically readably type optical disk and can record video information such as a game program, a moving picture and audio information such as music.

As indicated by dotted chain line D in FIG. 27, the cabinet shows a shield-like plan view. More specifically, the contour of the outer periphery of the cabinet includes a pair of straight linear parts that run in parallel with each other, a semicircular part that links the corresponding ends of the straightly linear parts and has a diameter equal to the distance between the corresponding ends and an arc-shaped part that has its center on the straight line passing through the center, or the middle point of the diameter, of the semicircular part and substantially the middle of the semicircular part and outside the semicircular part and connects the other ends of the paired straightly linear parts. The center, or the middle point of the diameter, of the semicircular part agrees with the center of the disk main body and that of the cabinet.

The cabinet is provided on the bottom surface thereof with an aperture for partly exposing the optical disk main body and also with a shutter for opening and closing the aperture. The opening and the shutter are arranged at the position on the cabinet where the optical disk main body is contained. When the optical disk D is mounted in an electronic appliance, the shutter is driven to open the aperture and allow the information recorded on the disk main body to be optically read.

Figure 28:
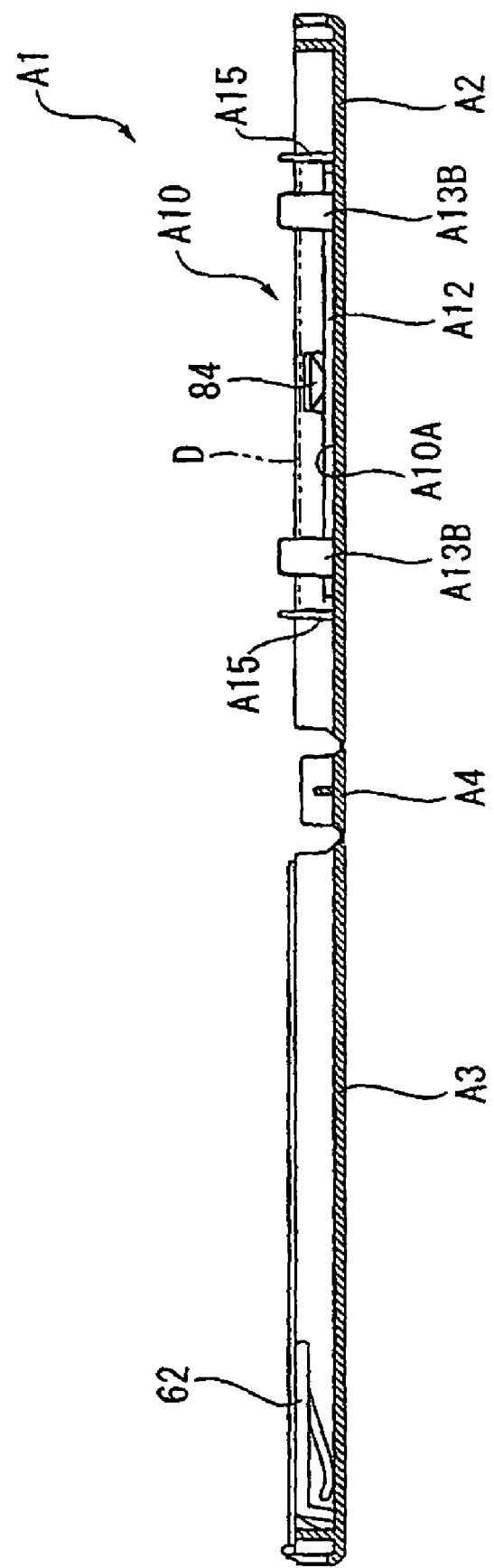
FIG. 28 is a cross sectional view of the ninth embodiment taken along line XXVIII-XXVIII in FIG. 27.

FIG. 28 is a schematic cross sectional view of the disk case Al taken along line XXVIII-XXVIII in FIG. 27.

The disk containing section A10 has in the inside thereof a containing space whose profile matches the profile of the cabinet of the optical disk D so that the optical disk D is snugly contained in the containing space. As shown in FIGS. 27 and 28, the disk containing section A10 includes a supporting projection A12 for supporting the optical disk D, four anchoring claws A13 arranged along the outer periphery of the supporting projection A12, a movement restricting section 84 (same as the movement restricting section 84 of the seventh embodiment) arranged at the center of the disk containing section A10 and rising walls A15 that operate as guide sections for guiding the optical disk D when the disk D is contained in the disk containing section A10.

Note that the disk containing section A10 is formed substantially at the center of the containing section A2 and the movement restricting section 84 is also arranged at the center of the containing section A2.

The supporting projection A12 is formed along the outer periphery of the optical disk D. More specifically, the supporting projection A12 rises from the bottom surface A10A of the disk containing section A10 with dimensions slightly smaller than those of the outer periphery of the optical disk D.

Thus, the supporting projection A12 shows a contour that matches that of the outer periphery of the optical disk D and hence includes a first arc-shaped section A121, a pair of straight line sections A122 and a second arc-shaped section A123. To be more accurate, the first arc-shaped section A121 is a semicircular part that corresponds to the semicircular part of the above-described cabinet of the optical disk D. The straight line sections A122 are a pair of straight linear parts that correspond to the straight linear parts of the cabinet of the optical disk D and extend from the opposite ends of the first arc-shaped section A121 in parallel with each other. The second arc-shaped section A123 corresponds to the arc-shaped part of the cabinet of the optical disk D. More specifically, the second arc-shaped section A123 links the ends of the straight line sections A122 remote from the first arc-shaped section A121 and has its center at point X that is located on the line passing through the middle point of the line connecting the ends of the pair of straight line sections A122 at the side of the first arc-shaped section A121, Or the center of the first arc-shaped section A121, and the middle point of the first arc-shaped section A121 and outside the first arc-shaped section A121.

The optical disk D is received on the top surface of the supporting projection A12 and, as a result, as shown in FIG. 28, it is supported along its edge by the supporting projection A12 and suspended above and away from the bottom surface of the disk containing section A10.

As shown in FIG. 27, a total of four anchoring claws A13 are arranged in the disk containing section A10. To be more accurate, the anchoring claws A13 are arranged outside the supporting projection A12 and two of them are located at the side of the first arc-shaped section A121, while the remaining two are located at the side of the second arc-shaped section A123. The anchoring claws A13 are arranged substantially in parallel with the respective lines that are tangent to the corresponding arcs of the optical disk D at their positions so as to become engaged with the peripheral edge of the optical disk D showing a substantially shield-like profile when the disk D is contained in the disk containing section A10. With this arrangement, the area by which each of the anchoring claws A13 is engaged with the optical disk D is maximized and the end facet of the optical disk D anchored by the anchoring claws A13 squarely faces the corresponding surfaces of the anchoring claws A13 to fully exploit the disk anchoring effect of the anchoring claws A13. Therefore, the optical disk D is reliably anchored by the anchoring claws A13 and hence the optical disk D is reliably and stably retained in the disk containing section A10.

The two anchoring claws A13A located at the side of the first arc-shaped section A121 are adapted to abut the lateral edge of the semicircular part of the optical disk D and press the optical disk D toward the bottom surface A10A of the disk containing section A10 so as to rigidly bold the optical disk D in position.

On, the other hand, the two anchoring claws A13B located at the side of the second arc-shaped section A123 are adapted to abut the lateral edge of the arc-shaped part of the optical disk D and also press the optical disk D toward the bottom surface A10A of the disk containing section A10 so as to rigidly hold the optical disk D in position.

The anchoring claws A13A, A13B are flexible and, when the optical disk D is contained in the disk containing section A10, they are deflected outwardly relative to the disk containing section A10 to inwardly exert urging force to the optical disk D. As a result, the optical disk D can be stably contained in the disk containing section A10.

The anchoring claws A13A are arranged at such positions that the straight lines A passing through the respective centers of the anchoring claws A13A and the center of the disk containing section A10 or the center of the optical disk main body of the optical disk D contained in the disk containing section A10 rectangularly intersect each other. The anchoring claws A13A are also arranged at such positions that they are separated by the same distance from the straight line B that connects the center of the first arc-shaped section A121 and that of the second arc-shaped section A123 of the supporting projection A12 and passes the center of the disk containing section A10 as center line. With this arrangement, when the optical disk D contained in the disk containing section A10 is taken out by lifting the semicircular part of the optical disk D, the optical disk D is disengaged from the two anchoring claws A13A simultaneously. Therefore, the optical disk D is prevented from being subjected to an unnecessary load that may take place if the optical disk D is disengaged from one of the anchoring claws A13A but not from the other anchoring claw A13A and becomes twisted when the optical disk D is taken out.

The operation of taking out the optical disk D will be described in greater detail hereinafter.

Figure 29:
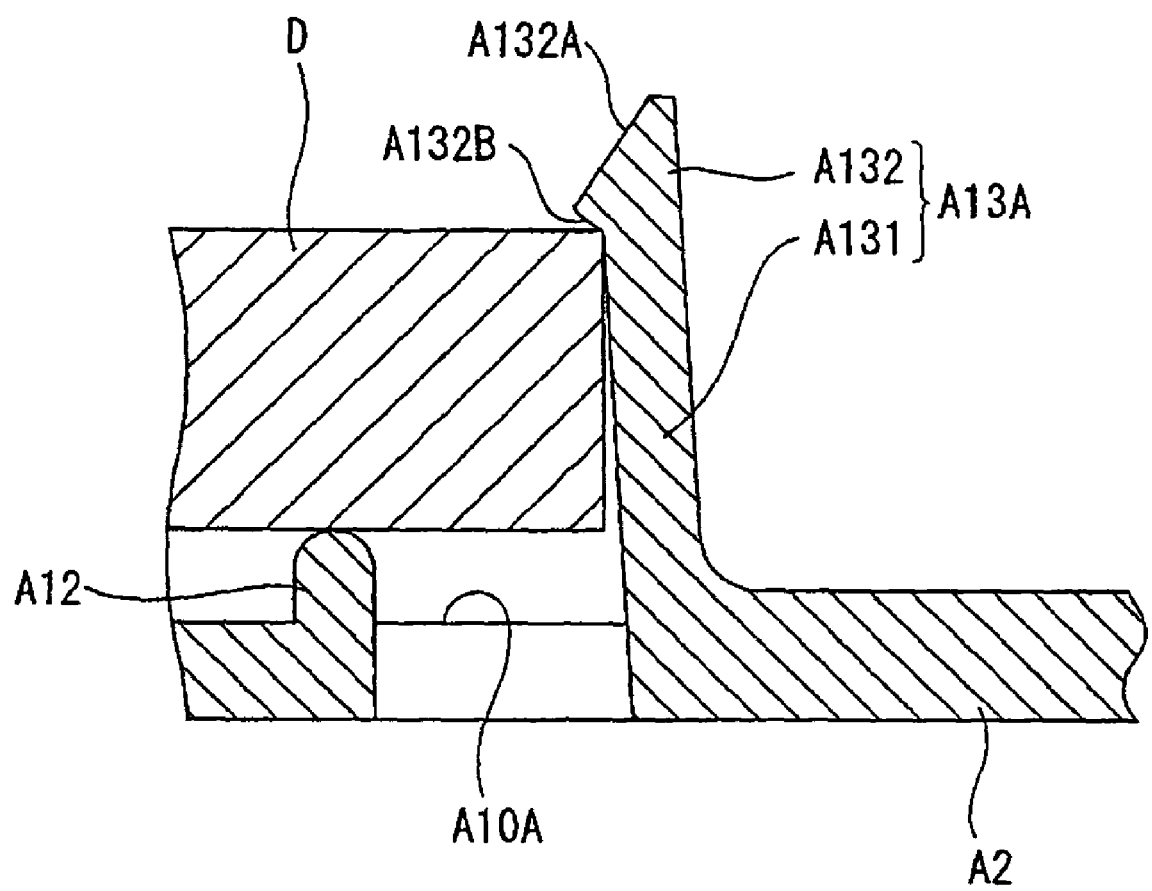
FIG. 29 is a cross sectional view of the ninth embodiment taken along line IXXX-IXXX in FIG. 27.
Figure 30:
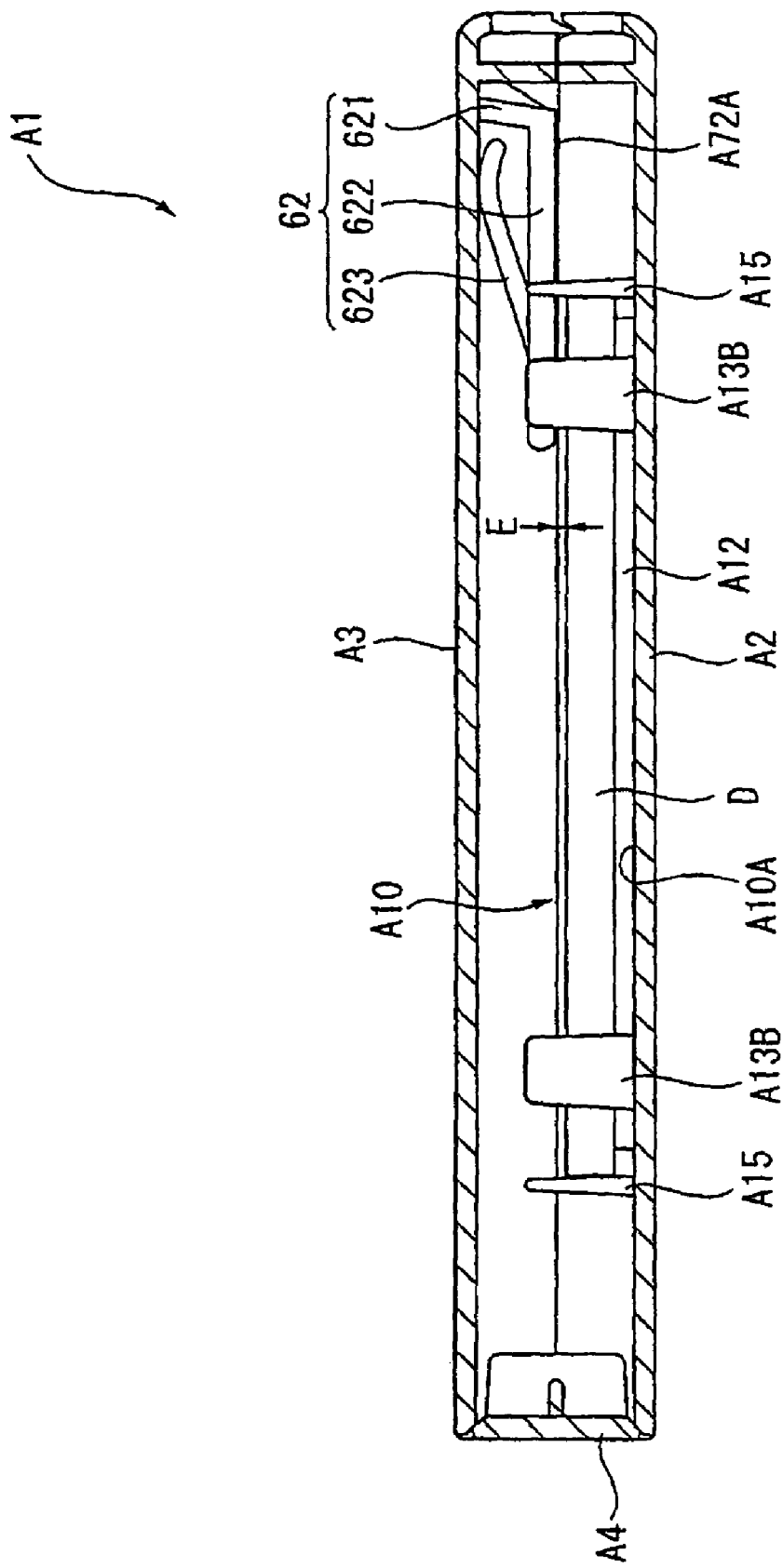
FIG. 30 is a cross sectional view of a closed disk case of the ninth embodiment.

FIG. 29 is a schematic cross sectional view of one of the anchoring claws A13A taken along line IXXX-IXXX in FIG. 27.

The anchoring claw A13A has a rising section A131 rising from the bottom surface of the containing section A2 and an anchoring section A132 projecting substantially toward the center of the disk containing section A10 from the front end of the rising section A131 to anchor the optical disk D contained in the disk containing section A10. Both the rising section A131 and the anchoring section A132 are integrally formed with the containing section A2. The projecting height of the anchoring claw A13A is greater than the thickness of the optical disk D.

The rising section A131 is slightly inclined toward the center of the disk containing section A10. As a result, when the optical disk D is contained in the disk containing section A10, the rising section A131 is outwardly slightly deflected to consequently apply urging force to the optical disk D.

The projecting height of the anchoring section A132 as measured from the bottom surface A10A of the disk containing section A10 is greater than the height of the top surface of the optical disk D contained in the disk containing section A10. The anchoring section A132 includes an upper inclined section A132A that is inclined so as to make the upper part thereof more remote from the disk containing section A10 and a lower inclined section A132B that is inclined so as to make the lower part thereof more remote from the disk containing section A11. The lower inclined section A132B abuts the lateral edge of the optical disk D contained in the disk containing section A10 so as to press the optical disk D toward the bottom surface A10A of the disk containing section A10, or downward in FIG. 29, and rigidly hold it in position. As a result, the optical disk D is anchored and any rocking motion of the optical disk D is suppressed.

Since the anchoring claw A13A is flexible and its rising section A131 is inclined toward the disk containing section A10 as described above, it is outwardly deflected when the optical disk D is contained in the disk containing section A10. As a result, when the optical disk D is contained in the disk containing section A10, the anchoring claw A13A is formed to keep its outwardly deflected posture. Then, the optical disk D is constantly subjected to inwardly urging force so that it is stably contained in the disk containing section A10.

The lower inclined section A132B formed as lower part of the anchoring section A132 is inclined so as to make the lower part thereof more remote from the disk containing section A10. With this arrangement, if the optical disk D contained in the disk containing section A10 has a thickness slightly different from the specified value, the anchoring claw A13A is outwardly deflected from the disk containing section A10 as a function of the inclination of the lower inclined section A132B so that it reliably applies pressure and urging force to the lateral edge of the optical disk D. Thus, the optical disk D is highly reliably anchored in position.

The anchoring claws A13B arranged at the side of the second arc-shaped section A123 are located at positions separated from the above-described straight line B by the same distance. The distance from each of the anchoring claws A13B to the straight line B-is greater than the distance from each of the anchoring claws A13A arranged at the side of the first arc-shaped section A121 to the straight-line B. More specifically, as shown in FIG. 27, the anchoring claws A13B are arranged more remotely from the straight line B than the anchoring claws A13A so that there is a gap Y between the straight line C1 that runs in parallel with the straight line B and passes through the center of engagement of each of the anchoring claws A13B and the straight line C2 that also runs in parallel with the straight line B and passes through the center of engagement of the corresponding one of the anchoring claws A13A. With this arrangement, it is possible to reliably anchor the optical disk D that is asymmetric relative to the straight line C3 that is perpendicular to the straight line B and passes through the center of the optical disk D. In other words, the anchoring claws A13B are arranged at positions more remote from the straight line B than the positions of the anchoring claws A13A and the anchoring claws A13B are adapted to anchor the optical disk D near the positions most remote from the straight line B so that the optical disk D is stabilized at opposite ends of the arc-shaped part thereof as viewed in a direction parallel to the straight line C3. Thus, as a result, the optical disk D is anchored stably.

Since the anchoring claws A13B are structurally identical with the anchoring claws A13A, they will not be described any further.

With the above described positional arrangement of the anchoring claws A13A, A13B, they are located at the four corners of the optical disk D so that, if compared with an arrangement where the anchoring claws A13A, A13B are not arranged at the four corners to anchor the optical disk D, the optical disk D is reliably and stably anchored with smaller pressure and smaller urging force.

Additionally, since the two anchoring claws A13B are separated from the straight line B by the same distance, the two anchoring claws A13B abutting the arc-shaped part of the optical disk D are simultaneously disengaged from the optical disk D when the optical disk D contained in the disk containing section A10 is lifted at the middle point of the arc-shaped part and taken out. Thus, as in the case of the above described anchoring claws A13A, no unnecessary load is applied to the optical disk D by the anchoring claws A13B when the optical disk D is taken out.

Still additionally, since the anchoring claws A13A are arranged at positions that form 90° with the center of the disk containing section A10, the paired anchoring claws A13A are separated from each other by about ¼ of the outer periphery of the optical disk D. Furthermore, since the anchoring claws A13B are separated from the straight line B by a distance greater than the distance separating the anchoring claws A13A from the straight line B, the anchoring claws A13B are also separated from each other by about ¼ of the outer periphery of the optical disk D and each of the anchoring claws A13A is separated from the neighboring one of the anchoring claws A13B also by about ¼ of the outer periphery of the optical disk D. Thus, the optical disk D can easily be taken out from the disk containing section A10 in any direction to make it so much easier to take out the optical disk D.

The rising walls A15 operate as disk guide sections for guiding the optical disk D into the disk containing section A10 when the optical disk D is contained in the disk containing section A10 and are arranged at positions where they abut the end facet of the contained optical disk D at the straight line parts of the optical disk D. The rising walls A15 rise up from the bottom surface of the containing section A2. The surfaces of the rising walls A15 located vis-à-vis the optical disk D are inclined so as to be located closer to the center of the disk containing section A10 at the base parts than at the front end parts thereof respectively. As a result, the optical disk D can be moved along the slopes of the rising walls A15 with ease until it is fully contained in the disk containing section A10 to make the optical disk 10 much easier to be contained. Additionally, the rising walls A15 are flexible so that, when containing the optical disk D in the disk containing section A10, the optical disk D abuts the rising walls A15 respectively at the straight linear parts thereof to outwardly deflect the rising walls A15. As a result, the rising walls A15 apply inwardly directed urging force to the optical disk D to suppress any rocking motion of the optical disk D that is contained in the disk containing section A10.

Now, the operation of taking out the optical disk D from the disk containing section A10 will be described below in detail.

When taking out the optical disk D contained in the disk containing section A10, firstly, the user touches the peripheral edge of the optical disk D with the thumb and the index finger or the middle finger of one hand at respective lateral positions substantially symmetrical relative to the center line of the optical disk D. Then, as the user lifts up the optical disk D at one of the lateral positions away from the bottom surface A10A of the disk containing section A10, the optical disk D is turned around a part of the supporting projection A12 located near the other lateral position, which part operates as fulcrum. As a result, the optical disk D is disengaged from the anchoring claws A13A, A13B and therefore the optical disk D can be taken out from the disk containing section A10. Since the supporting projection A12 is found inside of the outer periphery of the optical disk D that is supported by the supporting projection, the peripheral edge of the optical disk D is suspended above and away from the bottom surface A10A of the disk containing section A10. Therefore, the user can easily touch the end facet and the bottom surface of the optical disk D with the thumb and/or one of the fingers of one hand and take out the optical disk D from the disk containing section A10.

The disk case A1 of the ninth embodiment according to the present invention provides the following advantages.

(9-1) When an optical disk D is contained in the disk containing section A10 of the disk case A1, the optical disk D is received and supported by the supporting projection A12 that shows a contour similar to and slightly smaller than that of the outer periphery of the optical disk D. Since the supporting projection A12 has a profile similar to that of the outer periphery of the optical disk D, the user can easily recognize the front end and the tail end of the optical disk D when he or she contains the optical disk D in the disk containing section A10 as shown in FIG. 27 so that the user would not mistake the direction in which the optical disk D is to be contained.

(9-2) The optical disk D is anchored to the disk containing section A10 by means of the anchoring claws A13 (A13A, A13B) that are adapted to abut the lateral edge of the optical disk D at the semicircular part and at the arc-shaped part thereof. Thus, the user can take out the optical disk D from the disk containing section A10 by touching the lateral edge of the optical disk D with the thumb or one of the fingers of one hand at a position other than the positions where the anchoring claws A13 are abutting the lateral edge of the optical disk D. Since the supporting projection A12 shows a contour similar to and slightly smaller than that of the outer periphery of the optical disk D and the optical disk D is received by the supporting projection A12, the optical disk D is supported by the supporting projection A12 at the peripheral edge thereof so as to be suspended above and away from the bottom surface A10A of the disk containing section A10. Thus, when the user takes out the optical disk D, he or she can touch the end facet and the bottom surface of the optical disk D with the thumb and/or one of the fingers of one hand so that he of she can easily lift up the optical disk D away from the bottom surface A10A of the disk containing section A10. Therefore, the user can easily take out the optical disk D from the disk containing section A10.

(9-3) Since the anchoring claws A13 (A13A, A13B) for anchoring the optical disk D are flexible, they are deflected outwardly from the disk containing section A10 when the optical disk D is contained in the disk containing section A10. Then, they apply inwardly directed urging force to the optical disk D. Therefore, the optical disk D is subjected to not only the pressure applied by the lower inclined sections A132B of the anchoring claws A13 and directed toward the bottom surface A10A of the disk containing section A10 but also the inwardly directed urging force applied to it by the anchoring claws A13. Thus, the optical disk D can be stably contained in the disk containing section A10.

(9-4) Two anchoring claws A13A and two anchoring claws A13B are arranged respectively at the outside of the first arc-shaped section A121 and at the outside of the second arc-shaped section A123 of the supporting projection A12. Thus, the optical disk D is subjected to inwardly urging force that is directed substantially toward the center of the optical disk D and applied by the anchoring claws A13A, A13B so that the optical disk D can be stably contained in the disk containing section A10.

(9-5) The paired anchoring claws A13A arranged at the side of the first arc-shaped section A121 and the paired anchoring claws A13B arranged at the side of the second arc-shaped section A123 of the supporting projection A12 are separated from the straight line B respectively by same distances, the straight line B passing through the middle point of the first arc-shaped section A121 and that of the second arc-shaped section A123. More specifically, the paired anchoring claws A13A arranged at the side of the first arc-shaped section A121 are separated from the straight line B by the same distance and the paired anchoring claws A13B arranged at the side of the second arc-shaped section A123 are separated from the straight line B by the same distance. Thus, when the optical disk D is lifted at a position on the edge of the semicircular section or the arc-shaped section and taken out from the disk containing section A10, the paired anchoring claws A13A or the paired anchoring claws A13B that are located close to that position on the edge are disengaged from the optical disk D simultaneously so that the optical disk D is prevented from being subjected to a large local load and the optical disk D can be taken out with ease. Additionally, since the anchoring force can be applied evenly from the anchoring claws A13A and the anchoring claws A13B respectively to the semicircular part and the arc-shaped part of the optical disk D, it is possible to stably contain the optical disk D in position.

(9-6) The paired anchoring claws A13B arranged at the side of the second arc-shaped section A123 are arranged at positions more remote from the straight line B, or the center line of the disk containing section A10, than the paired anchoring claws A13A arranged at the side of the first arc-shaped section A121. Thus, the paired anchoring claws A13B are adapted to anchor the optical disk D at the opposite ends of the arc-shaped part of the optical disk D that is asymmetrical relative to the semicircular part of the optical disk D as viewed from the straight line C3 so that the optical disk D can be pressed and rigidly held in position more stably.

(9-7) The two anchoring claws A13A arranged at the side of the first arc-shaped section A121 of the disk containing section A10 are located at such positions that the straight lines A connecting the middle points of the anchoring claws A13A and the center of the disk containing section A10, or the rotary center of the optical disk D contained in the disk containing section A10, rectangularly intersect each other. With this arrangement, pressure and urging force exerted by the anchoring claws A13A can be applied efficiently to the optical disk D. Therefore, any rocking motion of the optical disk D contained in the disk containing section A10 is suppressed and the optical disk D is stably contained in the disk containing section A10

(9-8) The anchoring claws A13A are arranged at the side of the first arc-shaped section A121 so as to form an angle of 90° relative to the center of the disk containing section A10 and the anchoring claws A13B that are arranged at the side of the second arc-shaped section A123 are located at positions more separated from the straight line B than the anchoring claws A13A. With this arrangement, the anchoring claws A13A, A13B anchor the optical disk D at the four corners thereof so that any locking motion of the optical disk D in the disk containing section A10 can be effectively suppressed and the optical disk D can be contained in the disk containing section A10 so much more stably.

Additionally, the anchoring claws A13A, A13B are arranged along the outer periphery of the optical disk D in such a way that any two neighboring anchoring claws are separated from each other by ¼ of the outer periphery of the optical disk D. Therefore, the optical disk D can be taken out with ease from any direction.

Still additionally, if the optical disk D is inversely directed and placed in the disk containing section A10 in such a way that anchoring claws A13A anchor the arc-shaped part of the optical disk D and the anchoring claw A13B anchor the semicircular part of the optical disk D, the contour of the outer periphery of the optical disk D does not match the positions of the anchoring claws A13A, A13B due to the above described positional arrangement of the anchoring claws A13A, A13B so that it is possible not to anchor the optical disk D successfully. Thus, the optical disk D is prevented from being contained in the disk containing section A10 with an inverted posture.

(9-9) The anchoring claws A13A, A13B are arranged substantially in parallel with the respective lines that are tangent to the corresponding engaging positions of anchoring claws A13A, A13B and the optical disk D. With this arrangement, each of the anchoring claws A13A, A13B squarely faces the end facet of the optical disk D so that the anchoring force of each of the anchoring claws A13A, A13B can be efficiently applied to the end facet of the optical disk D. Therefore, the optical disk D is pressed and rigidly held in position very stably.

(9-10) The rising walls A15 are formed on the disk containing section A10 so as to rise from the bottom surface of containing scanning A2 at positions outside the straight line parts of the supporting projection 12 and located vis-à-vis the straight line parts of the optical disk D contained in the disk containing section A10. The surface of each of the rising walls A15 that faces the disk containing section A10 is inclined in such a way that it comes closer to the disk containing section A10 at the base end than at the front end thereof. With this arrangement, the optical disk D is guided into the disk containing section A10 by the rising walls A15 when the optical disk D is contained in the disk containing section A10 so as to make the operation of containing the optical disk D very simple.

Additionally, the rising walls A15 are formed outside the straight line sections A122 of the supporting projection A12 so as to run along the straight line sections A122. Therefore, the user can easily recognize the direction in which the optical disk D is to be received by the supporting projection A12 or the direction in which the optical disk D is to be contained in the disk containing section A10.

Still additionally, since the rising walls A15 are adapted to abut the end facets of the optical disk D, any rocking motion of the optical disk D in the disk containing section A10 is suppressed. Therefore, the optical disk D can be contained in the disk containing section A10 more stably.

(9-11) The disk case A1 and the optical disk D constitute an information providing body. Thus, the optical disk D and the disk case A1 having the supporting projection A12 showing a contour that matches the contour of the outer periphery of the optical disk D and adapted to snugly contain the optical disk D can be commercially distributed to the user as a single information providing body.

Thus, the present embodiment has, based on the present invention, its own advantages as described below:

The disk containing body according to the present invention has a containing section for containing a disk formed by mounting a disk main body in a cabinet; and a lid section for closing a disk receiving aperture of the containing section. The containing section has a supporting projection rising from the bottom surface of the containing section along the outer periphery of the cabinet of the disk for supporting the disk, and a plurality of flexible anchoring claws rising from the bottom surface of the containing section at the outside of the supporting projection and adapted to press the disk contained in the containing section from the aperture side toward the bottom surface of the containing section so as to rigidly hold the disk in position and apply inwardly directed urging force to the disk. The dimension of the supporting projection is smaller than the dimension of the outer periphery of the disk.

Thus, according to the present invention, the disk contained in the containing section of the disk containing body is supported by the supporting projection that is formed along the outer periphery of the disk and pressed toward the bottom surface of the containing section so as to be held in position by the anchoring claws. With this arrangement, the user can put one of his or her fingers onto the end facet of the disk from anywhere in the containing section except the spots where the anchoring claws are arranged so that he or she can easily take out the disk contained in the containing section.

Since the dimension of the supporting projection is smaller than the dimension of the outer periphery of the disk, the user can put one of his or her fingers onto the end facet of the disk with ease when he or she takes out the disk contained in the containing section.

More specifically, when the user takes out the disk from the containing section, he or she can put one of his or her fingers onto a surface area of the disk extending from the end facet to the bottom surface of the disk so that the user can easily raise the disk upward. Thus, the user can take out the disk from the containing section very easily.

Additionally, the disk contained in the containing section by the flexible anchoring claws is subjected to pressure directed toward the bottom surface of the containing section and urging force directed inwardly relative to the disk so that the disk is contained stably in the containing section.

Preferably, in the present invention, the supporting projection includes a pair of straight sections running substantially in parallel with each other, a semicircular first arc-shaped section connecting the corresponding ends of the straight sections and having a diameter equal to the distance between the pair of straight sections and a second arc-shaped section having its center at a point located on the straight line passing through the middle point of the first arc-shaped section and the middle point of the distance between the pair of straight sections, where the distance equals to the diameter of the first arc-shaped section, at a point outside the first arc-shaped section. The plurality of anchoring claws are arranged substantially symmetrically relative to the line connecting the middle point of the first arc-shaped section and that of the second arc-shaped section.

Thus, according to the present invention, the anchoring claws are arranged substantially symmetrically relative to the line connecting the middle point of the edge of the first arc-shaped section and that of the edge of the second arc-shaped section, the disk contained in the containing section is anchored by the anchoring claws as it is pinched by the anchoring claws so that the disk is stably contained in the containing section. Thus, if the disk shows an asymmetrical profile, it can be stably contained in the containing section.

Preferably, in the present invention, two anchoring claws are arranged at the side of the first arc-shaped section and two anchoring claws are arranged at the side of the second arc-shaped section.

Thus, according to the present invention, two anchoring claws are arranged at the side of the first arc-shaped section and two anchoring claws are arranged at the side of the second arc-shaped section so that the disk is subjected to inwardly directed urging force exerted by each of anchoring claws. Thus, the urging force applied to the disk is substantially directed to the center of the disk in a concentrated manner so that the disk is contained in position very stably.

Additionally, since the anchoring claws are symmetrically arranged relative to the line connecting the middle point of the edge of the first arc-shaped section and that of the edge of the second arc-shaped section, the disk is subjected to urging force that is evenly applied from the anchoring claws. As a result, the disk is contained in the containing section very stably.

Still additionally, the two anchoring claws arranged at the side of the first arc-shaped section and the two anchoring claws arranged at the side of the second arc-shaped section are substantially symmetrical relative to the center line connecting the middle point of the edge of the first arc-shaped section and that of the edge of the second arc-shaped section. In other words, both the pair of anchoring claws arranged at the side of the first arc-shaped section and the pair of anchoring claws arranged at the side of the second arc-shaped section is separated from the center line substantially by the same distance. With this arrangement, when the disk is raised at an edge thereof located at the side of the first arc-shaped section or the side of the second arc-shaped section, the disk is disengaged simultaneously from the pair of anchoring claws arranged at the side of the raised edge. Thus, the load locally applied to the disk is reduced if compared with a case where the disk is disengaged from the anchoring claws one by one and the force acting on the disk when the disk is disengaged from the anchoring claws is distributed to and near a part of the edge of the disk corresponding to the two disengaged anchoring claws. Therefore, the disk is prevented from being subjected to a local load and can be taken out very easily.

Furthermore, if the distance between the pairs of anchoring claws arranged at the side of the first arc-shaped section is substantially equal to the distance between the pair of anchoring claws arranged at the side of the second arc-shaped section and the user puts the thumb and/or one of the fingers of one hand onto the opposite lateral parts of the peripheral edge of the disk located on a line perpendicular to the center line and raises one of the lateral parts, the disk is disengaged simultaneously from the two anchoring claws out of the two pairs of anchoring claws arranged at the side of the first arc-shaped section and at the side of the second arc-shaped section. Thus, it is possible to suppress the local load applied to the disk regardless of the direction in which the disk is taken out. Then, the load applied to the disk when the disk is taken out is distributed and suppressed and at the same time, the disk can be taken out very easily.

Preferably, in the present invention, the distance separating the pair of anchoring claws arranged at the side of the first arc-shaped section is smaller than the distance separating the pair of anchoring claws arranged at the side of the second arc-shaped section.

Thus, according to the present invention, the pair of anchoring claws arranged at the side of the second arc-shaped section is located outside the pair of anchoring claws arranged at the side of the first arc-shaped section as viewed from the center line of the disk. Assume here that the disk is divided into two regions by a straight line passing through the center of the disk and rectangularly intersects the line connecting the middle point of the semicircular edge and that of the arc-shaped edge. Then, the half of the arc-shaped part side has an area greater than the half of the semicircular part side. With the above-described arrangement, the pair of anchoring claws arranged at the second arc-shaped side can stably press and rigidly hold the disk. As pointed out above, when the disk is divided by a line that is perpendicular to the center line, the semicircular part and the arc-shaped part of the disk are asymmetric relative to each other and the arc-shaped part has an area greater than the semicircular part. When the paired anchoring claws arranged at the side of the second arc-shaped section are separated from each other by a distance greater than the distance separating the paired anchoring claws arranged at the side of the first arc-shaped section, the anchoring claws arranged at the side of the second arc-shaped section anchor the disk at positions located closer to the end of the arc-shaped part of the disk as viewed in the direction of the straight line perpendicular to the center line if compared with the case where they are separated from each other by a distance smaller than the distance separating the paired anchoring claws arranged at the side of the first arc-shaped section so that consequently it is possible to stably press and rigidly hold the disk.

Preferably, in the present invention, the pair of anchoring claws arranged at the side of the first arc-shaped section are located respectively at such positions that the lines connecting them and the rotary center of the disk anchored by the claws substantially form an angle of 90°.

Thus, according to the present invention, each of the anchoring claws arranged respectively at two positions at the side of the first arc-shaped section is adapted to exert urging force that is directed toward the center of the disk. If the two anchoring claws arranged at the side of the first arc-shaped section are located at respective positions that are closer to middle point of the edge of the first arc-shaped section of the supporting projection, the force suppressing the motion of the disk in the direction perpendicular to the line connecting the middle point of the first arc-shaped section and that of the second arc-shaped section is weakened. If, on the other hand, the two anchoring claws are located at respective positions that are closer to the opposite ends of edge of the first arc-shaped section of the supporting projection, the force suppressing the motion of the disk in the direction in parallel with the line connecting the middle point of the first arc-shaped section and that of the second arc-shaped section is weakened. To the contrary, when the two anchoring claws are located respectively at such positions that the lines connecting them and the rotary center of the disk anchored by the claws substantially form an angle of 90°, both the motion of the disk in the perpendicular direction and the motion thereof in the parallel direction are effectively suppressed so that the disk can be stably contained in the containing section.

When the two anchoring claws that are arranged at the side of the first arc-shaped section are located respectively at such positions that the lines connecting them and the rotary center of the disk anchored by the claws substantially form an angle of 90° and the two anchoring claws that are arranged at the second arc-shaped section are separated from each other by a distance greater than the distance separating the paired anchoring claws arranged at the side of the first arc-shaped section, both the distance separating the paired anchoring claws arranged at the first arc-shaped section and the distance separating the paired anchoring claws arranged at the second arc-shaped section can be increased. Then, the disk can be easily taken out both in a direction perpendicular to the center line of the disk and in a direction parallel with the center line so that consequently it is very easy to take out the disk from the containing section.

Preferably, each of the anchoring claws is arranged substantially in parallel with the line that is tangent to the corresponding arc of the disk at its anchoring position.

Thus, according to the present invention, since each of the anchoring claws is arranged substantially in parallel with the line that is tangent to the corresponding arc of the disk at its anchoring position, the end facet of the disk and the surface of the anchoring claw arranged vis-à-vis the end facet of the disk and anchoring the disk squarely face each other. Thus, the anchoring force of the anchoring claw effectively acts on the corresponding part of the edge of the disk so that it is possible to press the disk and stably hold it in position.

Additionally, when two anchoring claws are arranged at the side of the first arc-shaped section and other two anchoring claws are arranged at the side of the second arc-shaped section of the supporting projection to anchor the disk and the anchoring claws arranged at the side of the second arc-shaped section are separated more from the center line connecting the middle point of edge of the first arc-shaped section and the middle point of the edge of the second arc-shaped section than the anchoring claws arranged at the side of the first arc-shaped section, it is possible to highly stably anchor the disk that is contained in the containing section and symmetric relative to the center line but asymmetric relative to the line passing through the center of the disk and perpendicular to the center line. Additionally, with such an arrangement, when the disk is taken out from the containing section by raising the disk at an end thereof located in a direction perpendicular to the center line, the disk is disengaged from the two anchoring claws located close the end of the disk and arranged substantially in parallel with the respective line that are tangent to the corresponding arcs of the optical disk at their anchoring positions with a time lag. Then, the disk can be taken out by releasing the engagement of the disk and one of the anchoring claws that is liable to be disengaged from the disk and then releasing the engagement of the disk and the other anchoring claw as a function of the inclination of the disk so that the disk can be taken out smoothly from the disk containing section with little force. Then, it is possible to take out the disk very easily.

Preferably, a pair of disk guide sections rise from the bottom surface of the containing section respectively along the pair of straight sections at the outside of the supporting projection to guide the disk.

Thus, according to the present invention, when the disk is contained in the containing section, it is guided by the disk guide sections and hence the operation of containing the disk can be conducted very simply and easily.

Feasible Modifications to 9th Embodiment

While the disk case A1 of the ninth embodiment has a single disk containing section A10, the present invention is by no means limited thereto and the disk case A1 may be so modified that it has a plurality of disk containing section A10 and is adapted to contain so many optical disks D.

Figure 31:
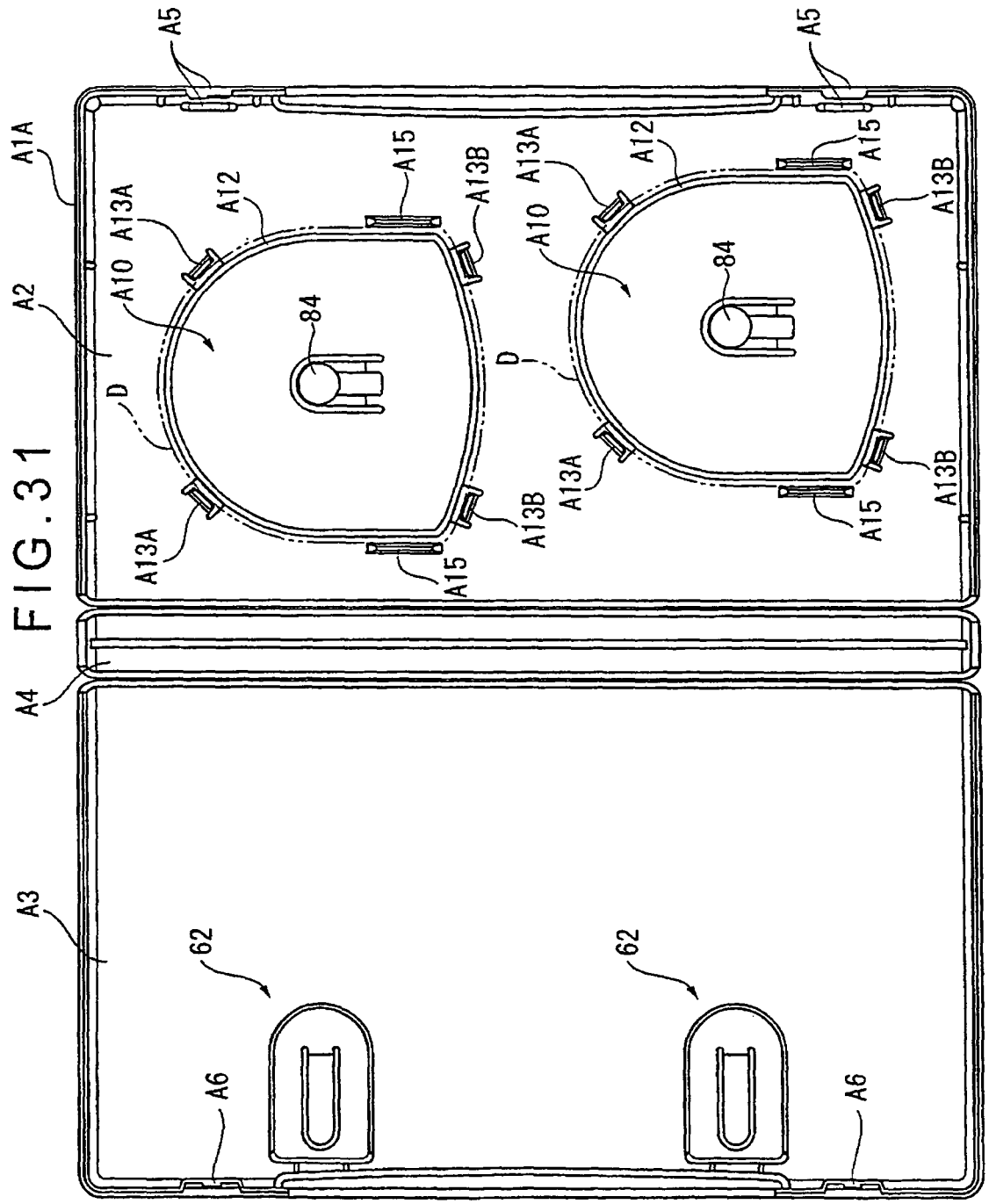
FIG. 31 is a schematic plan view of a disk case obtained by modifying the disk case of the ninth embodiment.

FIG. 31 illustrates a disk case A1A having two disk containing sections A10 that is obtained by modifying the ninth embodiment.

The disk case A1A comprises two disk containing sections A10 that are arranged at respective positions symmetrical relative to the center of the containing section A2 so that it can contain two optical disks D. Additionally, two keeping sections 62 are arranged at the corresponding positions on the lid section A3 located along an edge of the lid section A3 and adapted to partly cover the respective disk containing sections A10 when the disk case A1A is closed.

Each of the supporting projections A12 of the disk case A1A has a first arc-shaped section A121 located at a high position and a second arc-shaped section A123 located at a low position in FIG. 31. However, either or both the supporting projections A12 may be directed oppositely.

The disk case A1A can contain two optical disks D. In other words, the number of disk cases can be reduced relative to the number of optical disks D to be contained in disk cases. With such an arrangement, a movie or a game program recorded on a plurality of optical disks D can be efficiently stored. Additionally, since the disk case A1A does not differ from the disk case A1 in terms of profile, size and the opening/closing structure, the space in the disk case A1A can be effectively exploited.

While the anchoring claws A13A are arranged at such positions that the lines running through the respective centers of the anchoring claws A13A and the center of the disk containing section A10, or the rotary center of the disk main body of the optical disk D to be contained in the disk containing section A10, rectangularly intersect each other and the anchoring claws A13B are more separated from the straight line B connecting the middle points of the first and second arc-shaped sections A121, A123 of the supporting projection A12 than the anchoring claws A13A in the above described ninth embodiment, the present invention is by no means limited thereto. For example, the anchoring claws A13A, A13B may be arranged at such positions that both the anchoring claws A13A and the anchoring claws A13B are separated from the straight line B by the same distance. With such an arrangement, when the optical disk D is taken out from the disk containing section A10, the optical disk D is disengaged from the two anchoring claws A13A or A13A and A13B that are located close to the position at which the optical disk D is lifted regardless of the direction in which the optical disk D is taken out from the disk containing section A10. Therefore, it is possible to prevent the optical disk D from being subjected to any local load depending on the profile of the optical disk. Then, the optical disk can be taken out from the disk containing section very easily.

The angle of intersection of the straight lines A passing through the anchoring claws A13A and the center of the disk containing section A10 may smaller or greater than 90°. The two anchoring claws A13A may alternatively be arranged respectively at the side of the middle point of the first arc-shaped section A121 and at the side of the middle point of the second arc-shaped section A123 of the supporting projection A12 of the disk containing section A10.

However, when the anchoring claws A13A, A13B are arranged at the respective positions described above by referring to the above described embodiment, the urging force exerted by the anchoring claws A13A, A13B is efficiently applied to the optical disk D so that it is possible to stably contain the optical disk D in the disk containing section A10 and easily take out the optical disk D from the disk containing section A10.

Figure 32:
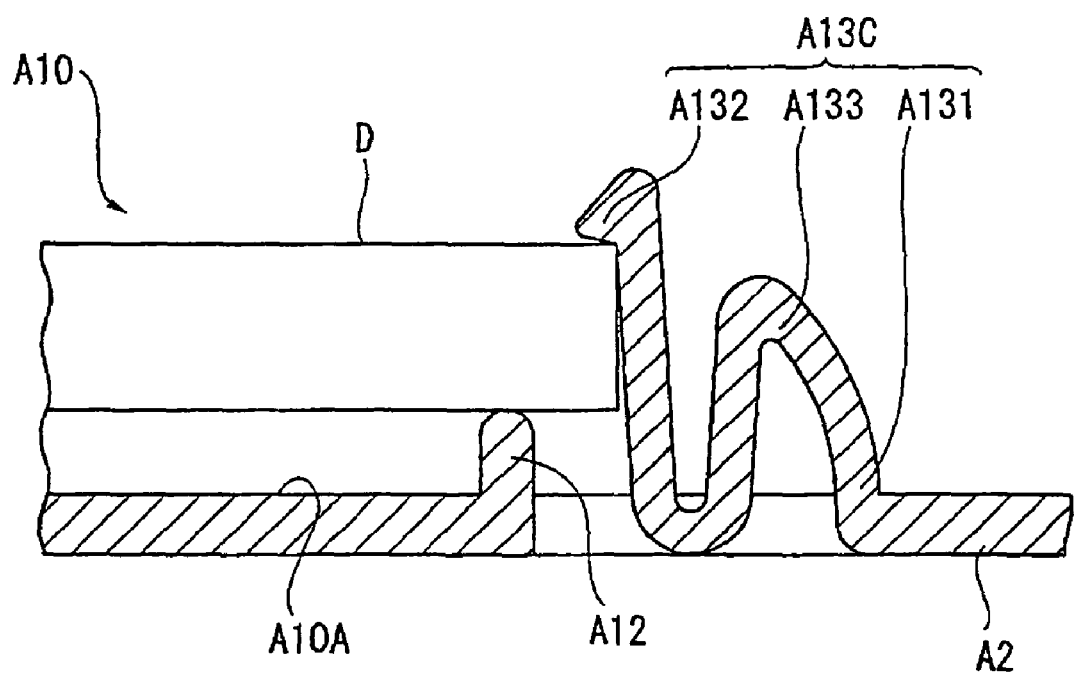
FIG. 32 is a cross sectional view of a modified anchoring claw that can be used in the ninth embodiment.

While the anchoring claws A13 (A13A, A13B) rise from the containing section A2 and are inclined in the above description of the ninth embodiment, the present invention is by no means limited thereto so long as they can anchoring the optical disk D. For example, each of the anchoring claws A13A, A13B may be replaced by an anchoring claw A13C as shown in FIG. 32 that comprises a rising section A131, an anchoring section A132 and a flexible meandering section 12A3 turning in different ways to show a substantially S-shaped lateral view to link the rising section A131 and the anchoring section A132. When such anchoring claws A13C are used, the meandering section A133 of each of the anchoring claws A13C is deflected like a spring so that the urging force exerted onto the optical disk D operates as appropriate pressure and hence the optical disk D is reliably, stably and rigidly held in position.

While the above described meandering section 12A3 of the anchoring claw A13C shows a substantially S-shaped lateral view, it may be replaced by a meandering section that turns for a plurality of times.

Feasible Modifications to 1st through 9th Embodiments

While a movement restricting section 14, 34 or 84 is arranged at the rotary center of the disk main body of the optical disk D in each of the above described embodiments, the present invention is by no means limited thereto and a disk case according to the perspective view may be free from such a movement restricting section 14, 34 or 84. However, it is preferable that a disk case according to the present invention is provided with such a movement restricting section because the movement restricting section urges the disk main body upward while the anchoring claws urge the cabinet downward so as to cooperate with each other and highly rigidly hold the optical disk in position.

The positions where the paired anchoring claws 12, 12A are arranged are not limited to the above description so long as they are disposed vis-à-vis due to the positional arrangement of the rising walls 11, 31. So are the anchoring claws 52 and the anchoring clips 53. Accordingly, the running direction of the supporting projected ridges 13 and the positions of the recesses 311 of the rising wall 31 may be determined appropriately.

While the keeping section 61, 62 or the keeping claw 7 is formed on the bottom surface of the lid section 2 at a position near the edge where the engaging projections 5 are arranged in the above description, the present invention is by no means limited thereto and alternatively be arranged in some other position. More specifically, the keeping section 61, 62 or the keeping claw 7 may be placed at any position so long as it is arranged on the bottom surface of the lid section 2 and the keeping section 61, 62 or the keeping section 72 of the keeping claw 7 at least partly covers the optical disk D contained in the disk containing section 10 when the containing section 1 is closed by the lid section 2. For example, the keeping section 61, 62 or the keeping claw 7 may be arranged near the edge of the lid section 2 located close to the belt-shaped section 3. The profiles of the keeping sections 61, 62 and the keeping claw 7 are not limited to those described above and may be modified appropriately.

Additionally, while the surfaces 61A, 62A of the keeping sections 61, 62 and the surface 722A of the keeping section 72 of the keeping claw 7 are adapted to abut the optical disk D contained in the disk containing section 10 when the disk case is closed, that is, the containing section 1 is closed by the lid section 2 in the above description, the present invention is by no means limited thereto. In other words, the surfaces 61A, 62A, 722A may not necessarily abut the optical disk D so long as they cover the disk containing section 10 from above in such a way that they prevent the optical disk D from slipping down from the disk containing section 10 defined by the rising wall 31 when the optical disk D is disengaged from the anchoring claws 12A.

Still additionally, for carrying out the present invention for practical purposes, the specific structure and the profile may be other than those described above so long as it achieves the object of the present invention.

While the optical disk D has a substantially shield-like profile in the above description of the preferred embodiments, it may show some other profile. For example, an optical disk showing a circular profile or a rectangular profile may also be used. Furthermore, a disk case according to the present invention can be used to contain not an optical disk but a magneto-optical disk, a magnetic disk, a record or the like.

The priority application Number JP2004-272526 upon which this patent application is based is hereby incorporated by reference.

What is claimed is:

1. A disk containing body comprising:
  a containing section containing a disk; and
  a lid section for closing a disk receiving aperture of the containing section,
  the containing section comprising:
  a rising wall rising from a bottom surface of the containing section along at least a part of an outer periphery of the disk;
  a pair of anchoring claws for holding the disk, the anchoring claws being respectively located at positions adapted to press and hold opposite ends of the disk on an extension of a diameter of the disk; and
  a supporting ridge formed at a position remote from and extending substantially parallel to a virtual line connecting the pair of anchoring claws supporting a part of the bottom surface of the disk, wherein
  the rising wall comprises a recess located opposite to the virtual line relative to the supporting ridge, the recess exposing a first end of the disk therethrough, and
  when the first end of the disk is pressed toward the bottom surface of the containing section, the disk is inclined and supported by the supporting ridge so that a second end of the disk opposite to the first end projects from the bottom surface of the containing section.

2. The disk containing body according to claim 1, wherein the pair of anchoring claws is arranged at a height suitable for resiliently pinching the disk at the opposite ends of the disk on the extension of the diameter of the disk when the disk is inclined so that the second end of the disk project from the bottom surface of the containing section.

3. The disk containing body according to claim 1, wherein the supporting ridge and the recess are formed at positions substantially symmetrical relative to the virtual line connecting the pair of anchoring claws.

4. The disk containing body according to claim 1, wherein an abutment surface of each of the anchoring claws to be abutted with the disk is a slope that comes closer to the bottom surface of the containing section toward the outer periphery of the disk.

5. The disk containing body according to claim 1, wherein a movement restricting section is provided on the bottom surface of the containing section projecting away from the bottom surface at a position corresponding to a rotary center of the disk so that, when the disk is engaged with the pair of anchoring claws, the movement restricting section urges the disk away from the bottom surface of the containing section to restrict a movement of the disk within the containing section.

6. The disk containing body according to claim 1, wherein the lid section is provided with a keeping section for preventing the disk contained in the containing section from slipping off when the lid section closes the disk receiving aperture of the containing section; and
the keeping section includes:
a rising section rising from the bottom surface of the lid section;
an extending section extending from the front end of the rising section substantially in parallel with a bottom surface of the lid section; and
a pinching section extending from a front end of the extending section toward the base end of the extending section and also toward the bottom surface of the lid section.

7. An information providing body comprising:
a containing section containing a disk storing information to be provided to an information processing apparatus; and
a lid section for closing a disk receiving aperture of the containing section,
the containing section comprising:
a rising wall rising from a bottom surface of the containing section along at least a part of an outer periphery of the disk;
a pair of anchoring claws for holding the disk, the anchoring claws being respectively located at positions adapted to press and hold opposite ends of the disk on an extension of a diameter of the disk; and
a supporting ridge formed at a position remote from and extending substantially parallel to a virtual line connecting the pair of anchoring claws supporting a part of the bottom surface of the disk, wherein
the rising wall comprises a recess located opposite to the virtual line relative to the supporting ridge, the recess exposing a first end of the disk therethrough, and
when the first end of the disk is pressed toward the bottom surface of the containing section, the disk is inclined and supported by the supporting ridge so that a second end of the disk opposite to the first end projects from the bottom surface of the containing section.

\* \* \* \* \*